(12) United States Patent
Tomuta et al.

(10) Patent No.: US 10,525,603 B2
(45) Date of Patent: Jan. 7, 2020

(54) METHOD AND APPARATUS FOR EXCHANGING NOZZLES AND TIPS FOR A FLUID DISPENSING SYSTEM

(71) Applicant: The Boeing Company, Chicago, IL (US)

(72) Inventors: Raul Tomuta, Long Beach, CA (US); Martin Hanna Guirguis, Long Beach, CA (US); Don David Trend, Huntington Beach, CA (US); Richard Philip Topf, Orange, CA (US); Angelica Davancens, Reseda, CA (US)

(73) Assignee: The Boeing Company, Chicago, IL (US)

( * ) Notice: Subject to any disclaimer, the term of this patent is extended or adjusted under 35 U.S.C. 154(b) by 615 days.

(21) Appl. No.: 13/973,528

(22) Filed: Aug. 22, 2013

(65) Prior Publication Data

US 2015/0053787 A1    Feb. 26, 2015

(51) Int. Cl.
*B23Q 3/155*    (2006.01)
*B05B 15/06*    (2006.01)
(Continued)

(52) U.S. Cl.
CPC .......... *B25J 15/0491* (2013.01); *B05B 15/65* (2018.02); *B05C 5/02* (2013.01); *B23Q 3/15566* (2013.01);
(Continued)

(58) Field of Classification Search
CPC ............. Y10T 483/132; Y10T 483/134; Y10T 483/17; B23Q 3/1556; B23Q 3/15566; Y10S 483/901
(Continued)

(56) References Cited

U.S. PATENT DOCUMENTS

| 1,003,650 A | 9/1911 | Redin |
| 1,909,146 A | 5/1933 | Bohanan |

(Continued)

FOREIGN PATENT DOCUMENTS

| CN | 1439999 A | 9/2003 |
| CN | 101858456 B | 12/2012 |

(Continued)

OTHER PUBLICATIONS

Office Action, dated Jun. 17, 2016, regarding U.S. Appl. No. 13/769,569, 13 pages.

(Continued)

*Primary Examiner* — Erica E Cadugan
*Assistant Examiner* — Michael Vitale
(74) *Attorney, Agent, or Firm* — Yee & Associates, P.C.

(57) ABSTRACT

A method and apparatus for attaching a nozzle to a fluid dispensing system and a tip to the nozzle. In one illustrative example, the fluid dispensing system may be moved by a robotic device towards a nozzle retaining structure having nozzle retaining areas holding nozzles. A nozzle may be selected for use based on a nozzle identifier element corresponding to each of the nozzles. The robotic device may move the fluid dispensing system to the nozzle selected to attach the fluid dispensing system to the nozzle selected. Further, the fluid dispensing system may be moved by a robotic device towards a tip retaining structure having tip retaining areas holding tips. A tip may be selected for use based on a tip identifier element corresponding to each of the tips. The robotic device may move the fluid dispensing system to the tip selected to attach the nozzle to the tip selected.

15 Claims, 23 Drawing Sheets

US 10,525,603 B2

Page 2

(51) Int. Cl.
   *B25J 15/04* (2006.01)
   *B25J 15/00* (2006.01)
   *B05C 5/02* (2006.01)
   *B05B 15/65* (2018.01)

(52) U.S. Cl.
   CPC ............ *B25J 15/008* (2013.01); *B25J 15/04* (2013.01); *B23Q 3/15526* (2013.01); *Y10S 483/901* (2013.01); *Y10T 29/49826* (2015.01); *Y10T 483/132* (2015.01); *Y10T 483/17* (2015.01)

(58) Field of Classification Search
   USPC .................. 483/8, 9, 16, 901; 293/390, 397; 239/390, 397
   See application file for complete search history.

(56) References Cited

U.S. PATENT DOCUMENTS

| | | |
|---|---|---|
| 1,988,557 A | 1/1935 | Jecker |
| 2,126,999 A | 8/1938 | Mitchell |
| 2,227,792 A | 1/1941 | Norton, Jr. |
| 2,608,705 A | 9/1952 | Duff |
| 2,609,974 A | 9/1952 | Brous |
| 2,824,443 A | 2/1958 | Ames |
| 2,978,722 A | 4/1961 | Kusakabe |
| 3,378,331 A | 4/1968 | Beasley |
| 3,661,679 A | 5/1972 | Law |
| 3,746,253 A | 7/1973 | Walberg |
| 3,865,525 A | 2/1975 | Dunn |
| 3,888,421 A | 6/1975 | Chow |
| 3,963,180 A * | 6/1976 | Wagner ............. B05B 9/01 239/288.5 |
| 4,239,157 A * | 12/1980 | Fasth ............. B05B 15/001 239/121 |
| 4,570,834 A | 2/1986 | Ward |
| 4,635,827 A | 1/1987 | Roedig |
| 4,698,005 A | 10/1987 | Kikuchi et al. |
| 4,925,061 A | 5/1990 | Jeromson, Jr. et al. |
| 4,932,094 A | 6/1990 | McCowin |
| 4,944,459 A * | 7/1990 | Watanabe ........... B05B 12/1472 239/305 |
| 4,948,016 A | 8/1990 | Summons et al. |
| 4,989,792 A | 2/1991 | Claasen |
| 5,017,113 A | 5/1991 | Heaton et al. |
| 5,060,869 A * | 10/1991 | Bekius ............. B05B 15/065 239/599 |
| 5,186,563 A | 2/1993 | Gebhard et al. |
| 5,271,521 A | 12/1993 | Noss et al. |
| 5,271,537 A | 12/1993 | Johnson |
| 5,319,568 A | 6/1994 | Bezaire |
| 5,346,380 A | 9/1994 | Ables |
| 5,462,199 A | 10/1995 | Lenhardt |
| 5,480,487 A | 1/1996 | Figini et al. |
| 5,571,538 A | 11/1996 | Cloud |
| 5,615,804 A | 4/1997 | Brown |
| 5,803,367 A | 9/1998 | Heard et al. |
| 5,906,296 A | 5/1999 | Martindale et al. |
| 5,920,974 A | 7/1999 | Bullen |
| 5,976,631 A | 11/1999 | Ramachandran |
| 5,992,686 A | 11/1999 | Cline et al. |
| 5,995,909 A | 11/1999 | Bretmersky et al. |
| 6,001,181 A | 12/1999 | Bullen |
| 6,082,587 A | 7/2000 | Martindale et al. |
| 6,213,354 B1 | 4/2001 | Kay |
| 6,471,774 B1 * | 10/2002 | Krueger ............. B05C 1/06 118/203 |
| 6,536,969 B2 | 3/2003 | Nishitani |
| 6,698,617 B1 | 3/2004 | Szymanski |
| 6,739,483 B2 | 5/2004 | White et al. |
| 6,935,541 B2 | 8/2005 | Campbell et al. |
| 6,942,736 B2 | 9/2005 | Chinander et al. |
| 6,986,472 B2 | 1/2006 | Gordon |
| 7,101,107 B1 | 9/2006 | Byun |
| 7,172,096 B2 | 2/2007 | O'Dougherty |
| 7,275,663 B2 | 10/2007 | Campbell et al. |
| 7,578,416 B2 | 8/2009 | Underwood |
| 7,592,033 B2 | 9/2009 | Buckley et al. |
| 7,815,132 B2 | 10/2010 | Baltz |
| 7,922,107 B2 | 4/2011 | Fox |
| 8,181,822 B2 | 5/2012 | Doelman et al. |
| 8,453,876 B2 | 6/2013 | Miller |
| 8,534,499 B2 | 9/2013 | Williams et al. |
| 8,651,046 B1 | 2/2014 | Davancens et al. |
| 9,016,530 B2 | 4/2015 | Topf et al. |
| 2001/0038039 A1 | 11/2001 | Schultz et al. |
| 2003/0156401 A1 * | 8/2003 | Komine ............. B23B 31/02 361/815 |
| 2004/0129208 A1 * | 7/2004 | Nolte ............. B05B 12/1454 118/305 |
| 2004/0192524 A1 | 9/2004 | Nolte et al. |
| 2005/0145724 A1 | 7/2005 | Blette et al. |
| 2006/0081175 A1 | 4/2006 | Nagase |
| 2008/0083371 A1 | 4/2008 | Clifford |
| 2009/0291196 A1 | 11/2009 | Morris et al. |
| 2010/0260531 A1 | 10/2010 | Rademacher |
| 2011/0297175 A1 | 12/2011 | Pires et al. |
| 2012/0273115 A1 | 11/2012 | Suzuki et al. |
| 2014/0234011 A1 | 8/2014 | Tomuta et al. |
| 2014/0326760 A1 | 11/2014 | Topf et al. |
| 2015/0028051 A1 | 1/2015 | Topf et al. |
| 2015/0044376 A1 | 2/2015 | Topf et al. |
| 2015/0064357 A1 | 3/2015 | Tomuta et al. |
| 2016/0175883 A1 | 6/2016 | Tomuta et al. |

FOREIGN PATENT DOCUMENTS

| | | | |
|---|---|---|---|
| CN | 104136130 A | 11/2014 | |
| DE | 102004027789 A1 | 2/2005 | |
| DE | 202005005619 U1 | 2/2006 | |
| DE | 102004042211 A1 | 3/2006 | |
| DE | 102007038791 A1 * | 2/2009 | ............... B05C 5/02 |
| DE | 102008010169 A1 | 9/2009 | |
| DE | 202007019244 U1 | 8/2011 | |
| DE | 102010030375 A1 | 12/2011 | |
| EP | 0181483 A1 | 5/1986 | |
| EP | 1245348 A1 | 10/2002 | |
| EP | 1425107 B1 | 5/2006 | |
| EP | 2277631 A1 | 1/2011 | |
| EP | 2839885 A1 | 2/2015 | |
| FR | 2508350 A1 | 12/1982 | |
| GB | 2282554 A | 4/1995 | |
| GB | 2481299 A | 12/2011 | |
| JP | S4929616 A | 3/1974 | |
| JP | S5016734 A | 2/1975 | |
| JP | S52142747 A | 11/1977 | |
| JP | S5827672 A | 3/1983 | |
| JP | S61187269 U | 11/1986 | |
| JP | S625856 U | 1/1987 | |
| JP | S62148379 U | 9/1987 | |
| JP | H0395597 U | 9/1991 | |
| JP | H04038459 A | 2/1992 | |
| JP | H04083549 A | 3/1992 | |
| JP | H05154428 A | 6/1993 | |
| JP | S5924172 U | 2/1994 | |
| JP | H09314305 A | 12/1997 | |
| JP | H11262717 A | 9/1999 | |
| JP | 2002059049 A | 2/2002 | |
| JP | 2002192345 A | 7/2002 | |
| JP | 2002280798 A | 9/2002 | |
| JP | 2005138260 A | 6/2005 | |
| JP | 20105518 A | 1/2010 | |
| JP | 2010034571 A | 2/2010 | |
| WO | WO0067915 A1 | 11/2000 | |
| WO | WO2004073883 A1 | 9/2004 | |
| WO | WO2005012845 A2 | 2/2005 | |
| WO | WO2010093494 A1 | 8/2010 | |
| WO | WO2011108358 A2 | 9/2011 | |

(56) References Cited

FOREIGN PATENT DOCUMENTS

| WO | WO2013112178 A1 | 8/2013 |
|---|---|---|
| WO | 2014126675 A1 | 8/2014 |

OTHER PUBLICATIONS

Final Office Action, dated Jun. 3, 2016 regarding U.S. Appl. No. 13/963,218, 17 pages.
International Search Report and Written Opinion, dated Apr. 4, 2014, regarding Application No. PCT/US2014/011879, 9 pages.
International Search Report and Written Opinion, dated Jun. 4, 2014, regarding Application No. PCT/US2014/033738, 9 pages.
International Search Report and Written Opinion, dated Oct. 7, 2014, regarding Application No. PCT/US2014/040989, 10 pages.
Extended European Search Report, dated Oct. 15, 2014, regarding Application No. 14175644.5, 6 pages.
International Search Report and Written Opinion, dated Oct. 15, 2014, regarding Application No. PCT/US2014/045018, 9 pages.
Office Action, dated Oct. 1, 2014, regarding U.S. Appl. No. 13/886,535, 17 pages.
Notice of Allowance, dated Dec. 19, 2014, regarding U.S. Appl. No. 13/886,535, 13 pages.
Office Action, dated Nov. 28, 2014, regarding U.S. Appl. No. 13/951,817, 17 pages.
Extended European Search Report, dated Jan. 8, 2015, regarding Application No. EP14180160.5, 6 pages.
"Dispense Valves for Adhesives, Sealants, Lubricants, Epoxy, Polyurethane, Silicone & More," Kiss, No-Drip, Snuf-Bak, Tip-Seal,Manual, Metering, and High Flow valve part specifications, Sealant Equipment and Engineering, Inc., 12 pages, accessed Apr. 9, 2013. http://www.sealantequipment.com/dispensevalves-1part.htm.
"No-Drip Air Operated Fluid Dispense Valve," 2100-108 Series part specifications, Sealant Equipment and Engineering, Inc., 2 pages, accessed Apr. 9, 2013. http://www.sealantequipment.com/pdf/DispenseValves/2100-108%20No-Drip%20Valves.pdf.
"Compliance Nozzle," 1208-178-000 part specifications, Sealant Equipment and Engineering, Inc., 2 pages, accessed Apr. 9, 2013. http://sealantequipment.com/pdf/DispenseValves/1208-178%20Compliance%20Nozzle.pdf.
Topf et al., "Feedback Control System for Performing Fluid Dispensing Operations," U.S. Appl. No. 13/951,817, filed Jul. 26, 2013, 51 pages.
Davancens et al., "Robotic Sealant and End Effector," U.S. Appl. No. 12/842,247, filed Jul. 23, 2014, 41 pages.
Tomuta et al., "Fluid Application Device," U.S. Appl. No. 13/769,569, filed Feb. 18, 2013, 63 pages
Topf et al., "Control Valve Having a Disposable Valve Body," U.S. Appl. No. 13/886,535, filed May 3, 2013, 52 pages.
Tomuta et al., "Fluid Application Device." U.S. Appl. No. 14/016,846, filed Sep. 3, 2013, 59 pages.
"PPG Semco® Fillet Nozzles," PPG Aerospace, [online], [retrieved on Aug. 21, 2013] Retrieved online from<http://www.ppg.com/coatings/aerospace/semcoappsys/ semcosystems/semcopkgproducts/nozzlessmoothingtools/Pages/filletNozzles.aspx>, 2 pages.
"PPG Semco® Specialty Application Nozzles, Technical Data," PPG Industries Semco Packaging & Application Systems, [online] [retrieved on Aug. 21, 2013] Retrieved online from <http://www.ppg.com/coating/aerospace/semcoplg/semco_specialtLapplication_nozzels.pdf> 2 pages.
Office Action, dated Nov. 19, 2015, regarding U.S. Appl. No. 13/963,218, 54 pages.
Final Office Action, dated Feb. 8, 2016, regarding U.S. Appl. No. 13/769,569, 18 pages.
Canadian Intellectual Property Office Examination Search Report, dated Jun. 10, 2015, regarding Application No. 2,858,185, 5 pages.
Canadian Intellectual Property Office Examination Search Report, dated Aug. 5, 2015, regarding Application No. 2,855,480, 4 pages.
Office Action, dated Aug. 25, 2015, regarding U.S. Appl. No. 13/769,569, 44 pages.
Final Office Action, dated Sep. 1, 2015, regarding U.S. Appl. No. 14/016,846, 10 pages.
Office Action, dated May 11, 2015, regarding U.S. Appl. No. 14/016,846, 36 pages.
Notice of Allowance, dated Mar. 27, 2015, regarding U.S. Appl. No. 13/951,817, 12 pages.
Office Action, dated Oct. 7, 2016 regarding U.S. Appl. No. 13/963,218, 14 pages.
European Patent Office Communication, dated Nov. 30, 2016, regarding Application No. EP14703214.8, 6 pages.
State Intellectual Property Office of PRC Notification of First Office Action and English Translation, dated Nov. 28, 2016, regarding Application No. 201480008306X, 42 pages.
Canadian Intellectual Property Office Examination Report, dated Dec. 21, 2016, regarding Application No. 2,898,323, 3 pages.
Final Office Action, dated Dec. 30, 2016, regarding U.S. Appl. No. 13/769,569, 19 pages.
State Intellectual Property Office of PRC Notification of First Office Action and English Translation, dated Apr. 24, 2017, regarding Application 201480045021.3, 19 pages.
Notice of Allowance, dated Apr. 19, 2017, regarding U.S. Appl. No. 13/963,218, 20 pages.
European Patent Office Communication, dated Mar. 22, 2017, regarding USPTO Application No. EP14180160.5, 4 pages.
Canadian Intellectual Property Office Examination Report, dated Apr. 21, 2017, regarding Application No. 2,855,480, 4 pages.
Canadian Intellectual Property Office Office Action, dated Oct. 17, 2017, regarding Application No. 2,898,323, 15 pages.
Office Action, dated Sep. 21, 2017, regarding U.S. Appl. No. 13/769,569, 21 pages.
Office Action, dated Sep. 22, 2017, regarding U.S. Appl. No. 15/057,090, 38 pages.
State Intellectual Property Office of the PRC Notification of Third Office Action, dated Jan. 5, 2018, regarding Application No. 201480008306X, 50 pages.
Canadian Intellectual Property Office Examination Report, dated Feb. 12, 2018, regarding Application No. 2,855,480, 14 pages.
Japanese Patent Office Notice of Reasons for Rejection, dated Feb. 6, 2018, regarding Application No. 2015-558012, 24 pages.
Final Office Action, dated Jan. 19, 2018, regarding U.S. Appl. No. 15/057,090, 24 pages.
Korean Intellectual property Office Notice of Office Action, dated Feb. 14, 2018, regarding Application No. 10-2014-0089520, 12 pages.
State Intellectual Property Office of the PRC Notification of First Office Action, dated Dec. 1, 2017, regarding Application No. 2014104087216, 26 pages.
State Intellectual Property Office of the PR First Notification of Office Action, dated Jan. 2, 2018, regarding Application No. 201410443281.8, 9 pages.
Notice of Allowance dated May 23, 2018, regarding U.S. Appl. No. 15/057,090, 14 pages.
Japanese Patent Office Notice of Reasons for Rejection and English translation, dated May 15, 2018, regarding Application No. 2014-167395, 10 pages.
State Intellectual Property Office of PRC Notification of Second Office Action with English Translation, dated Sep. 26, 2018, regarding Application No. 2014104087216, 18 pages.
European Patent Office Communication, dated Nov. 16, 2018, regarding Application No. 14703214.8, 4 pages.
State Intellectual Property Office of PRC, Notification of Fourth Office Action, and English translation, dated Jul. 25, 2018, regarding Application No. 201480008306X, 15 pages.
Canadian Intellectual Property Office, Examination Search Report, dated Jul. 31, 2018, regarding Application No. 2898323, 19 pages.

* cited by examiner

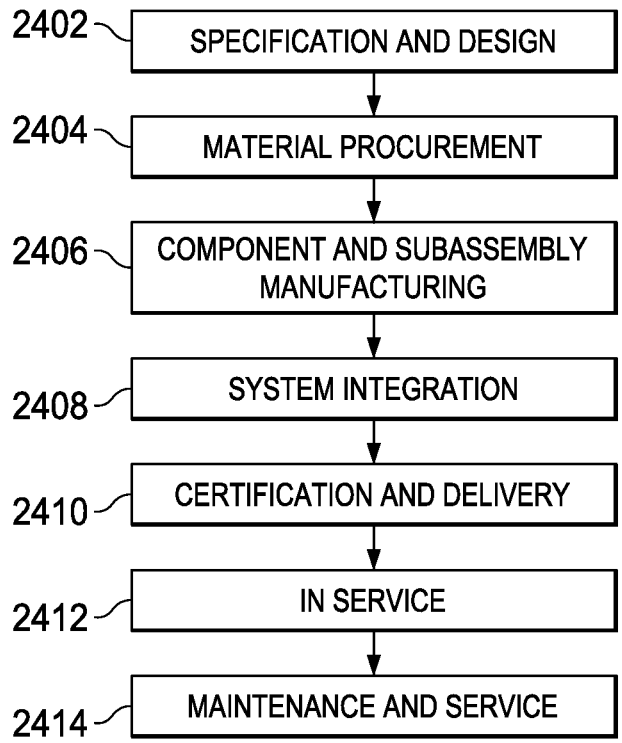
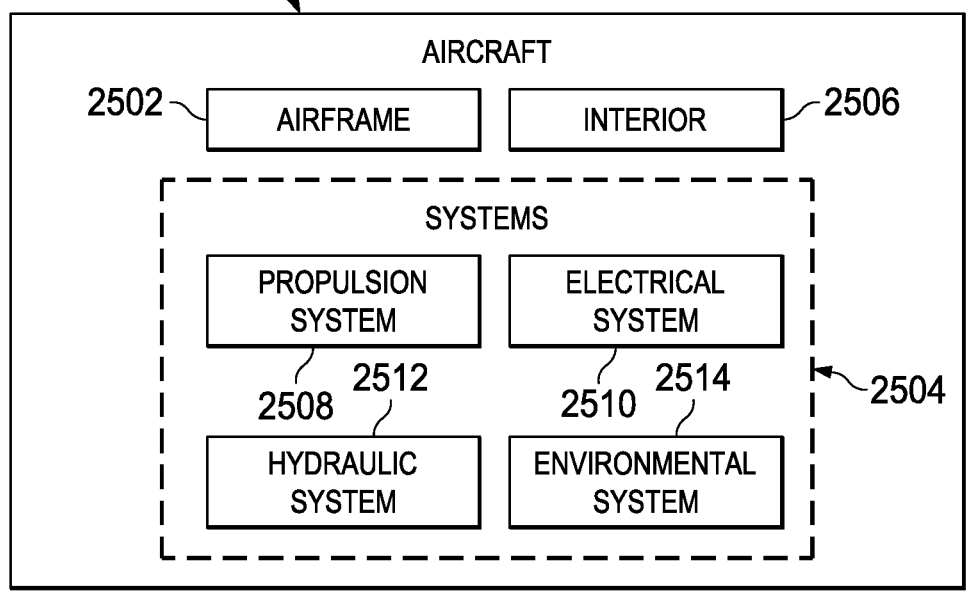

METHOD AND APPARATUS FOR EXCHANGING NOZZLES AND TIPS FOR A FLUID DISPENSING SYSTEM

BACKGROUND INFORMATION

1. Field

The present disclosure relates generally to fluid dispensing systems and, in particular, to exchanging nozzles of and/or tips for nozzles of fluid dispensing systems. Still more particularly, the present disclosure relates to a method and apparatus for automating the process of exchanging nozzles of and/or tips for nozzles of fluid dispensing systems.

2. Background

A fluid dispensing system may use various types of nozzles to dispense a fluid. When a new nozzle is needed, a current nozzle on the fluid dispensing system may be unscrewed from the fluid dispensing system such that the new nozzle can then be screwed into the fluid dispensing system. This process may be performed by a human operator and/or by using machinery. The human operator and/or machinery may need to be present every time a nozzle needs to be changed for a fluid dispensing system. Consequently, exchanging nozzles for a fluid dispensing system may be more time-consuming and expensive than desired.

Further, whenever a nozzle is exchanged on a fluid dispensing system, the fluid source connected to the fluid dispensing system may need to be re-pressurized, the fluid may be need to be re-purged, and/or the nozzle tip may need to be recalibrated. Performing these operations may be more time-consuming and expensive than desired.

Still further, different types of tips may be used with a nozzle. With currently available fluid dispensing systems, exchanging tips for nozzles of fluid dispensing systems may be more difficult and expensive than desired. For example, without limitation, exchanging the tip on a nozzle may require removing the nozzle itself from the fluid dispensing system in order to change the tip of the nozzle. Further, a human operator or human-operated machinery may be needed to change the tip of a nozzle. It may be desirable to have a system for automating the process of exchanging nozzles of and/or tips for nozzles of fluid dispensing systems. Therefore, it would be desirable to have a method and apparatus that take into account at least some of the issues discussed above, as well as other possible issues.

SUMMARY

In one illustrative embodiment, an apparatus comprises a tip retaining structure and a number of tip identifier elements. The tip retaining structure may have a number of tip retaining areas configured to hold a number of tips. The number of tip identifier elements may correspond to the number of tips. A tip from the number of tips is selected for use with a nozzle of a fluid dispensing system based on the number of tip identifier elements corresponding to the number of tips.

In another illustrative embodiment, an apparatus comprises a nozzle retaining structure and a number of nozzle identifier elements. The nozzle retaining structure may have a number of nozzle retaining areas configured to hold a number of nozzles. The number of nozzle identifier elements may correspond to the number of nozzles. A nozzle from the number of nozzles is selected for use with a fluid dispensing system based on the number of nozzle identifier elements corresponding to the number of nozzles.

In yet another illustrative embodiment, a nozzle and tip exchange system may comprise a tip retaining structure, a nozzle retaining structure, a base configured to hold the tip retaining structure and the nozzle retaining structure, and a plurality of identifier elements. The tip retaining structure may have a number of tip retaining areas configured to hold a number of tips. The nozzle retaining structure may have a number of nozzle retaining areas configured to hold a number of nozzles. The plurality of identifier elements may comprise a number of tip identifier elements and a number of nozzle identifier elements. The number of tip identifier elements may correspond to the number of tips in which the number of tip identifier elements may be located on one of the number of tips and the tip retaining structure. The number of nozzle identifier elements may correspond to the number of nozzles in which the number of nozzle identifier elements may be located on one of the number of nozzles and the nozzle retaining structure.

In another illustrative embodiment, a method for attaching a tip to a nozzle of a fluid dispensing system may be provided. The fluid dispensing system may be moved by a robotic device towards a tip retaining structure having a number of tip retaining areas holding a number of tips. A tip may be selected for use based on a tip identifier element corresponding to each of the number of tips. The robotic device may move the fluid dispensing system to the tip selected to attach the nozzle of the fluid dispensing system to the tip selected.

In still yet another illustrative embodiment, a method for attaching a nozzle to a fluid dispensing system may be provided. The fluid dispensing system may be moved by a robotic device towards a nozzle retaining structure having a number of nozzle retaining areas holding a number of nozzles. A nozzle may be selected for use based on a nozzle identifier element corresponding to each of the number of nozzles. The robotic device may move the fluid dispensing system to the nozzle selected to attach the fluid dispensing system to the nozzle selected.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 24 is an illustration of an aircraft manufacturing and service method in the form of a flowchart in accordance with an illustrative embodiment; and FIG. 25 is an illustration of an aircraft in the form of a block diagram in accordance with an illustrative embodiment.

DETAILED DESCRIPTION

The illustrative embodiments recognize and take into account different considerations. For example, the illustrative embodiments recognize and take into account that it may be desirable to have a system for automating the process of exchanging nozzles and tips for nozzles of a fluid dispensing system. In particular, the illustrative embodiments recognize and take into account that it may be desirable to have an automated system for exchanging nozzles and tips when the fluid dispensing system takes the form of an end effector.

Figure 1:
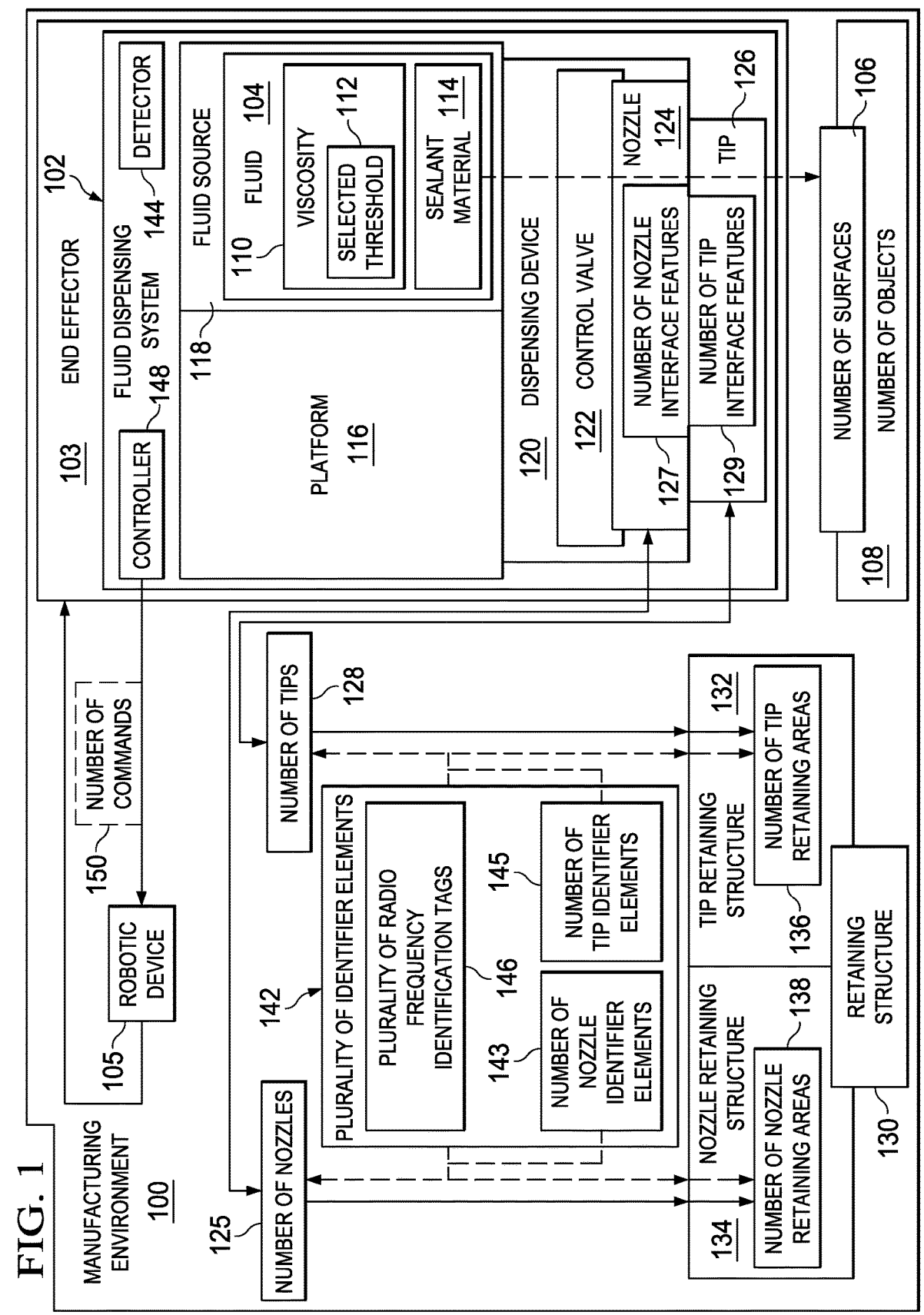
FIG. 1 is an illustration of a manufacturing environment in the form of a block diagram in accordance with an illustrative embodiment.

Referring now to the figures and, in particular, with reference to FIG. 1, an illustration of a manufacturing environment is depicted in the form of a block diagram. In this illustrative example, manufacturing environment 100 is an example of an environment in which fluid dispensing system 102 may be used. Fluid dispensing system 102 may take the form of end effector 103 for robotic device 105 in this example.

Robotic device 105 may be, for example, without limitation, a robotic arm, a robotic operator, or some other type of robotic device. Robotic device 105 may be configured to move fluid dispensing system 102 in this illustrative example. In some cases, robotic device 105 may be configured to control the movement of and/or operation of one or more components within fluid dispensing system 102.

Fluid dispensing system 102 may be configured to dispense fluid 104 onto number of surfaces 106 of number of objects 108. As used herein, a "number of" items includes one or more items. In this manner, number of surfaces 106 may include one or more surfaces. Similarly, number of objects 108 may include one or more objects.

Fluid 104 may have viscosity 110 greater than selected threshold 112. Selected threshold 112 may be, for example, without limitation, about 500 centipoise. In one illustrative example, fluid 104 may take the form of sealant material 114.

As depicted, fluid dispensing system 102 may include platform 116, fluid source 118, and dispensing device 120. Fluid source 118 and dispensing device 120 may be configured for association with platform 116.

As used herein, when one component is "associated" with another component, the association is a physical association in the depicted examples. For example, a first component, such as fluid source 118 may be considered to be associated with a second component, such as platform 116, by being secured to the second component, bonded to the second component, mounted to the second component, welded to the second component, fastened to the second component, and/or connected or attached to the second component in some other suitable manner. The first component also may be connected to the second component using a third component. Further, the first component may be considered to be associated with the second component by being formed as part of and/or as an extension of the second component.

In this illustrative example, dispensing device 120 may include control valve 122 and nozzle 124. Nozzle 124 may be associated with control valve 122. In one illustrative example, nozzle 124 may be considered part of control valve 122. In another illustrative example, nozzle 124 may be attached to control valve 122.

Nozzle 124 may be disposable in this illustrative example. In other words, nozzle 124 may be removably associated with platform 116. Depending on the implementation, exchanging nozzle 124 may include exchanging just nozzle 124 or all of dispensing device 120. In other words, dispensing device 120 may be disposable in some illustrative examples.

Further, as depicted, tip 126 may be attached to nozzle 124. In this illustrative example, tip 126 may be removably associated with nozzle 124. Tip 126 may be configured for use in applying fluid 104 in a desired shape.

Nozzle 124 for fluid dispensing system 102 may be selected from number of nozzles 125. Tip 126 may be selected for nozzle 124 from number of tips 128. In this illustrative example, the process of exchanging nozzles using number of nozzles 125 and exchanging tips using number of tips 128 may be automated.

Each nozzle in number of nozzles 125 may have a number of nozzle interface features configured for use in attaching any one of number of tips 128 to that nozzle. Further, each tip in number of tips 128 may have a number of tip interface features configured for use in attaching the tip to any one of number of nozzles 125. For example, without limitation, nozzle 124 may have number of nozzle interface features 127, and tip 126 may have number of tip interface features 129. Number of tip interface features 129 and number of nozzle interface features 127 may be engaged to attach tip 126 to nozzle 124.

Retaining structure 130 may be configured to hold tip retaining structure 132 and nozzle retaining structure 134. Tip retaining structure 132 may have number of tip retaining areas 136 configured to hold number of tips 128. In other words, each tip retaining area in number of tip retaining areas 136 may be configured to hold a corresponding tip in number of tips 128. In particular, each tip retaining area may be configured to retain a particular type of tip. For example, without limitation, each tip retaining area may have a shape and/or size configured to receive a particular type of tip. Of course, in some illustrative examples, each tip retaining area may be able to receive any type of tip in number of tips 128.

Further, nozzle retaining structure 134 may have number of nozzle retaining areas 138. Each nozzle retaining area in number of nozzle retaining areas 138 may be configured to hold a corresponding nozzle in number of nozzles 125. Each nozzle retaining area may be configured to retain a particular type of nozzle. For example, without limitation, each nozzle retaining area may have a shape and/or size configured to receive a particular type of nozzle. Of course, in some illustrative examples, each nozzle retaining area may be able to receive any type of nozzle in number of nozzles 125.

In this illustrative example, robotic device 105 may be configured to move fluid dispensing system 102 towards retaining structure 130 such that a nozzle and a tip for the nozzle may be selected. For example, without limitation, robotic device 105 may be configured to move platform 116 towards retaining structure 130.

Plurality of identifier elements 142 may be used by fluid dispensing system 102 to select a nozzle from number of nozzles 125 and a tip from number of tips 128 for that nozzle. Plurality of identifier elements 142 may include number of nozzle identifier elements 143 that correspond to number of nozzles 125 and number of tip identifier elements 145 that correspond to number of tips 128.

In one illustrative example, plurality of identifier elements may take the form of plurality of radio frequency identification (RFID) tags 146. In other words, number of tip identifier elements 145 may be implemented using a number of radio frequency identification tags in plurality of radio frequency identification tags 146, while number of nozzle identifier elements 143 may be implemented using another number of radio frequency identification tags in plurality of radio frequency identification tags 146.

The radio frequency identification tag used for a particular tip in number of tips 128 may be attached to either the tip itself or the tip retaining area in number of tip retaining areas 136 configured to hold the tip. Similarly, the radio frequency identification tag used for a particular nozzle in number of nozzles 125 may be attached to either the nozzle itself or the nozzle retaining area in number of nozzle retaining areas 138 configured to hold the nozzle.

Fluid dispensing system 102 may include detector 144 and controller 148. Each of detector 144 and controller 148 may be associated with at least one of platform 116, fluid source 118, or dispensing device 120. Detector 144 and controller 148 may be used to select a particular nozzle and/or tip based on plurality of identifier elements 142.

For example, without limitation, detector 144 may read a signal emitted by a radio frequency identification tag in plurality of radio frequency identification tags 146 and then send data about the radio frequency identification tag to controller 148. Controller 148 may then determine whether the nozzle or tip identified by the radio frequency identification tag is the nozzle or tip to be selected. Controller 148 may then send number of commands 150 to robotic device 105 to control movement of fluid dispensing system 102. In particular, depending on the signal read from the radio frequency identification tag, controller 148 may send number of commands 150 to robotic device 105 to either move fluid dispensing system 102 to enable attachment to the particular nozzle or tip or to move dispensing device 120 to a different position along retaining structure 130 such that a signal from a different radio frequency identification tag may be read.

In this manner, the process of exchanging nozzles and/or tips for nozzles may be automated. The system described above may reduce the overall time, expense, and labor involved with exchanging nozzles and tips.

The illustration of manufacturing environment 100 in FIG. 1 is not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

For example, although plurality of identifier elements 142 have been described as being implemented as plurality of radio frequency identification tags 146, plurality of identifier elements 142 may be implemented in some other manner. In some illustrative examples, each of plurality of identifier elements 142 may take the form of a distinct marker or label. Each identifier element in plurality of identifier elements 142 may have a distinguishing color, different size, different shape, and/or other feature that may be detected by detector 144. In these examples, detector 144 may take the form of an imaging system, an infrared imaging system, a laser system, or some other type of system or device capable of detecting the distinguishing feature of each of plurality of identifier elements 142. Controller 148 may make decisions based on, for example, without limitation, data received from detector 144. Depending on the implementation of detector 144, that data may be in the form of imaging data, infrared data, or some other type of data.

Figure 2:
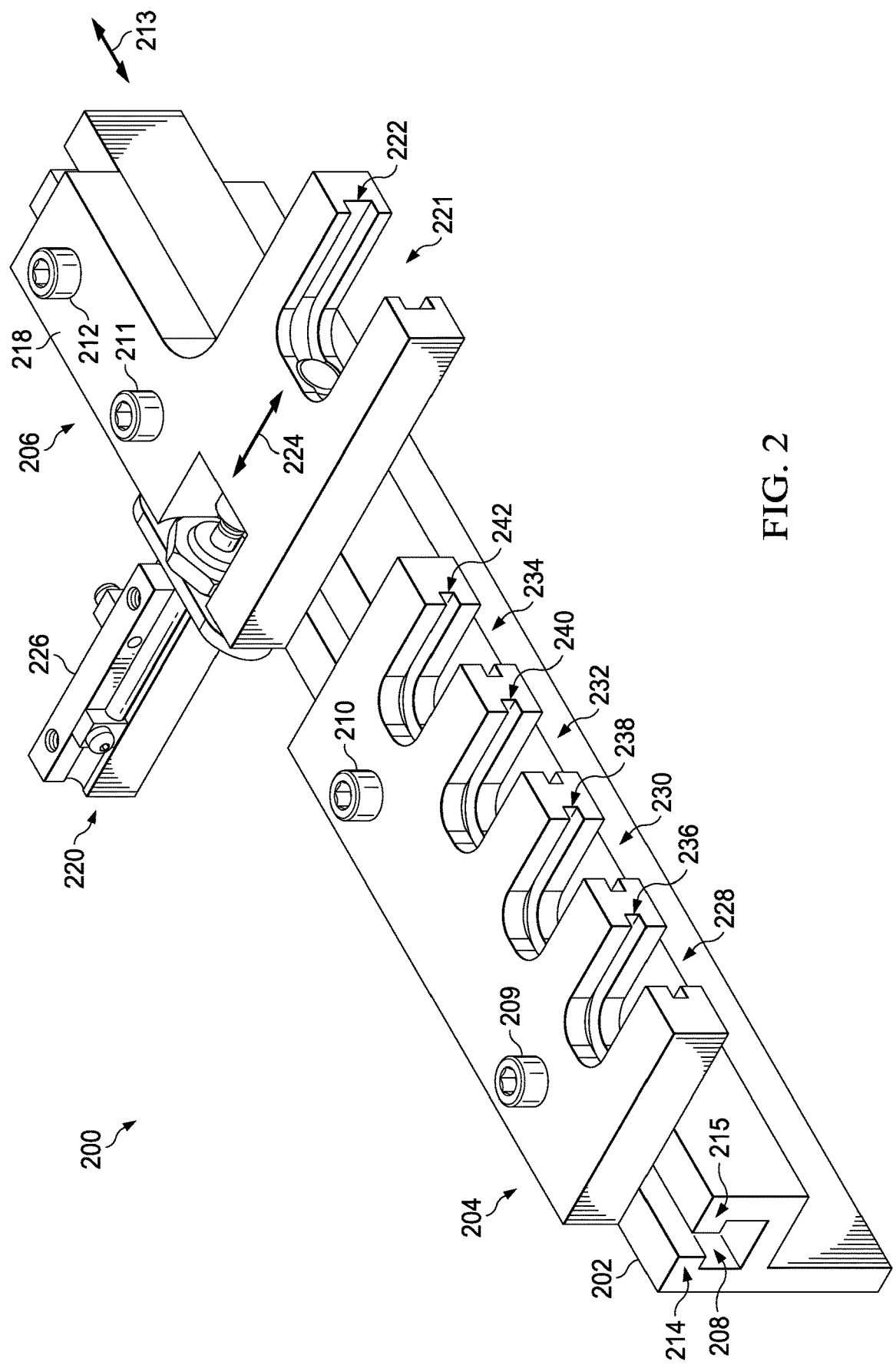
FIG. 2 is an illustration of a front isometric view of a retaining structure in accordance with an illustrative embodiment.

With reference now to FIG. 2, an illustration of a front isometric view of a retaining structure is depicted in accordance with an illustrative embodiment. Retaining structure 200 may be an example of one implementation for retaining structure 130 in FIG. 1. Retaining structure 200 may include base 202, tip retaining structure 204, and nozzle retaining structure 206. Tip retaining structure 204 and nozzle retaining structure 206 may be examples of tip retaining structure 132 and nozzle retaining structure 134, respectively, in FIG. 1.

Base 202 may hold tip retaining structure 204 and nozzle retaining structure 206. As depicted, base 202 may include channel 208. Tip retaining structure 204 and nozzle retaining structure 206 may be configured to move along channel 208 in a direction along axis 213.

In particular, tip retaining structure 204 may be connected to base 202 by fastener 209 and fastener 210. Fastener 209 and fastener 210 may be used to move tip retaining structure 204 along channel 208. Nozzle retaining structure 206 may be connected to base 202 by fastener 211 and fastener 212. Fastener 211 and fastener 212 may be used to move nozzle retaining structure 206 along channel 208.

Further, base 202 may have flange 214 and flange 215 configured to hold tip retaining structure 204 and nozzle retaining structure 206. Flange 214 and flange 215 may help constrain tip retaining structure 204 and nozzle retaining structure 206.

Tip retaining structure 204 and nozzle retaining structure 206 may be slid along channel 208 in a direction along axis 213 for attachment to or removal from base 202. In this manner, different types of tip retaining structures and/or different types of nozzle retaining structures may be used with base 202 of retaining structure 200.

In this illustrative example, nozzle retaining structure 206 may include base 218, actuation device 220, and nozzle retaining area 221. Nozzle retaining area 221 may have groove 222 configured to receive a nozzle (not shown). Nozzle retaining area 221 may be an example of one implementation for number of nozzle retaining areas 138 in FIG. 1.

Actuation device 220 may be configured to move a nozzle (not shown) held within nozzle retaining area 221 in a direction along axis 224. In particular, actuation device 220 may include pneumatic piston device 226 that may be configured to move the nozzle (not shown) held within nozzle retaining area 221 in a direction along axis 224.

As depicted, tip retaining structure may have tip retaining areas 228, 230, 232, and 234, each configured to hold a tip (not shown). Tip retaining areas 228, 230, 232, and 234 may be an example of one implementation for number of tip retaining areas 136 in FIG. 1. Tip retaining areas 228, 230, 232, and 234 may have grooves 236, 238, 240, and 242, respectively, each configured to receive a tip (not shown).

Figure 3:
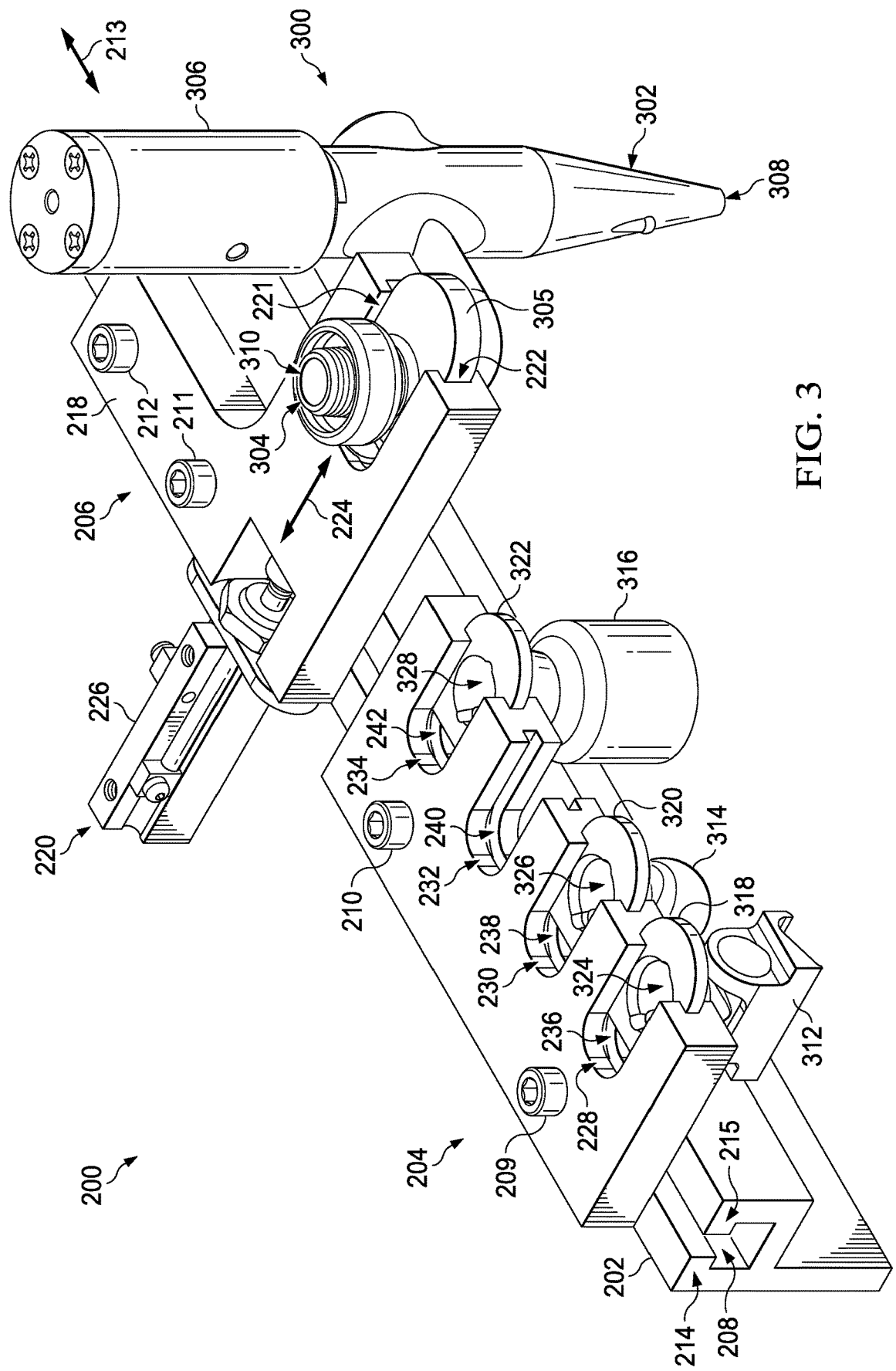
FIG. 3 is an illustration of a front isometric view of a retaining structure being used to hold a nozzle and tips in accordance with an illustrative embodiment.

With reference now to FIG. 3, an illustration of a front isometric view of retaining structure 200 from FIG. 2 being used to hold a nozzle and tips is depicted in accordance with an illustrative embodiment. In this illustrative example, nozzle retaining structure 206 may hold dispensing device 300. Dispensing device 300 may be an example of one implementation for dispensing device 120 in FIG. 1. Dispensing device 300 may include nozzle 302, attachment interface 304, protruding feature 305, and control valve 306. Nozzle 302 and control valve 306 may be examples of implementations for nozzle 124 and control valve 122, respectively, in FIG. 1.

As depicted, nozzle 302 may have exit 308 through which fluid may be dispensed. In this illustrative example, attachment interface 304 may be used to attach dispensing device 300, and thereby nozzle 302, to a fluid dispensing system (not shown). As depicted, attachment interface 304 may include attachment element 310 that may be received within a corresponding part of the fluid dispensing system (not shown) to connect dispensing device 300 to this fluid dispensing system.

Protruding feature 305 may be an example of one implementation for number of nozzle interface features 127 in FIG. 1. Protruding feature 305 may be received by groove 222 in nozzle retaining area 221. In particular, protruding feature 305 may be slid into groove 222 such that nozzle retaining area 221 may hold dispensing device 300, and thereby nozzle 302.

In this illustrative example, tip retaining area 228 may hold tip 312. Tip retaining area 230 may hold tip 314. Tip retaining area 234 may hold tip 316. Tip 312 may have protruding feature 318 that may be slid into and out of groove 236 of tip retaining area 228. Further, tip 314 may have protruding feature 320 that may be slid into and out of groove 238 of tip retaining area 230. Still further, tip 316 may have protruding feature 322 that may be slid into and out of groove 242 of tip retaining area 234.

Tips 312, 314, and 316 may be examples of implementations for tips in number of tips 128 in FIG. 1. Each of protruding features 318, 320, and 322 may be an example of one implementation for number of tip interface features 129 in FIG. 1.

As depicted, tips 312, 314, and 316 may have openings 324, 326, and 328, respectively. These openings may be configured to receive the end of a nozzle, such as nozzle 302 of dispensing device 300. In particular, nozzle 302 may be inserted into the opening of one of these tips to attach the tip to nozzle 302 and then nozzle 302 with the tip attached to the nozzle may be moved out of the corresponding tip retaining area.

Figure 4:
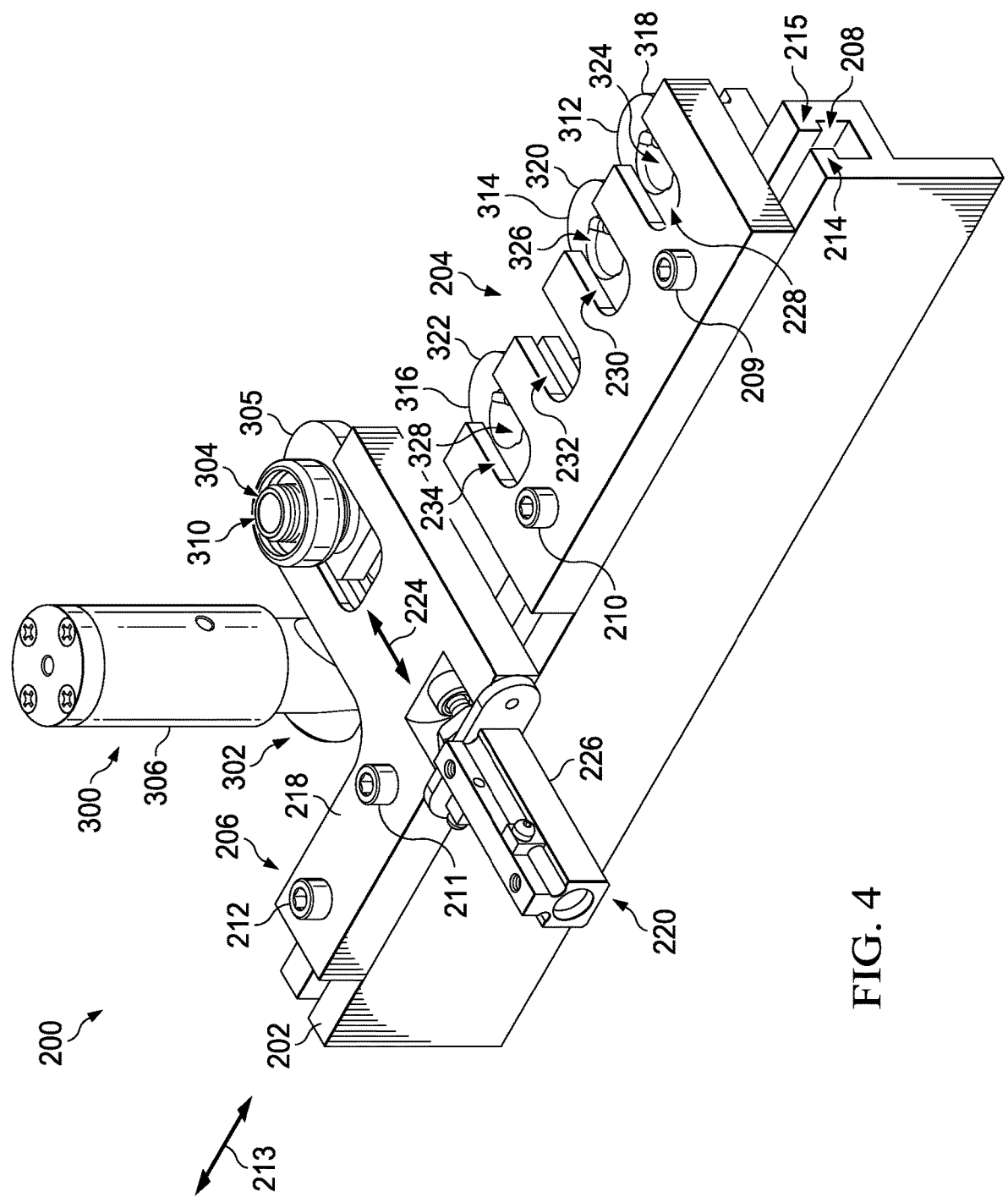
FIG. 4 is an illustration of a back isometric view of a retaining structure holding a dispensing device and tips in accordance with an illustrative embodiment.

Turning now to FIG. 4, an illustration of a back isometric view of retaining structure 200 holding dispensing device 300, tips 312, 314, and 316 from FIG. 3 is depicted in accordance with an illustrative embodiment. In this illustrative example, the back of base 202 may be clearly seen. Further, actuation device 220 and pneumatic piston device 226 may be more clearly seen.

Figure 5:
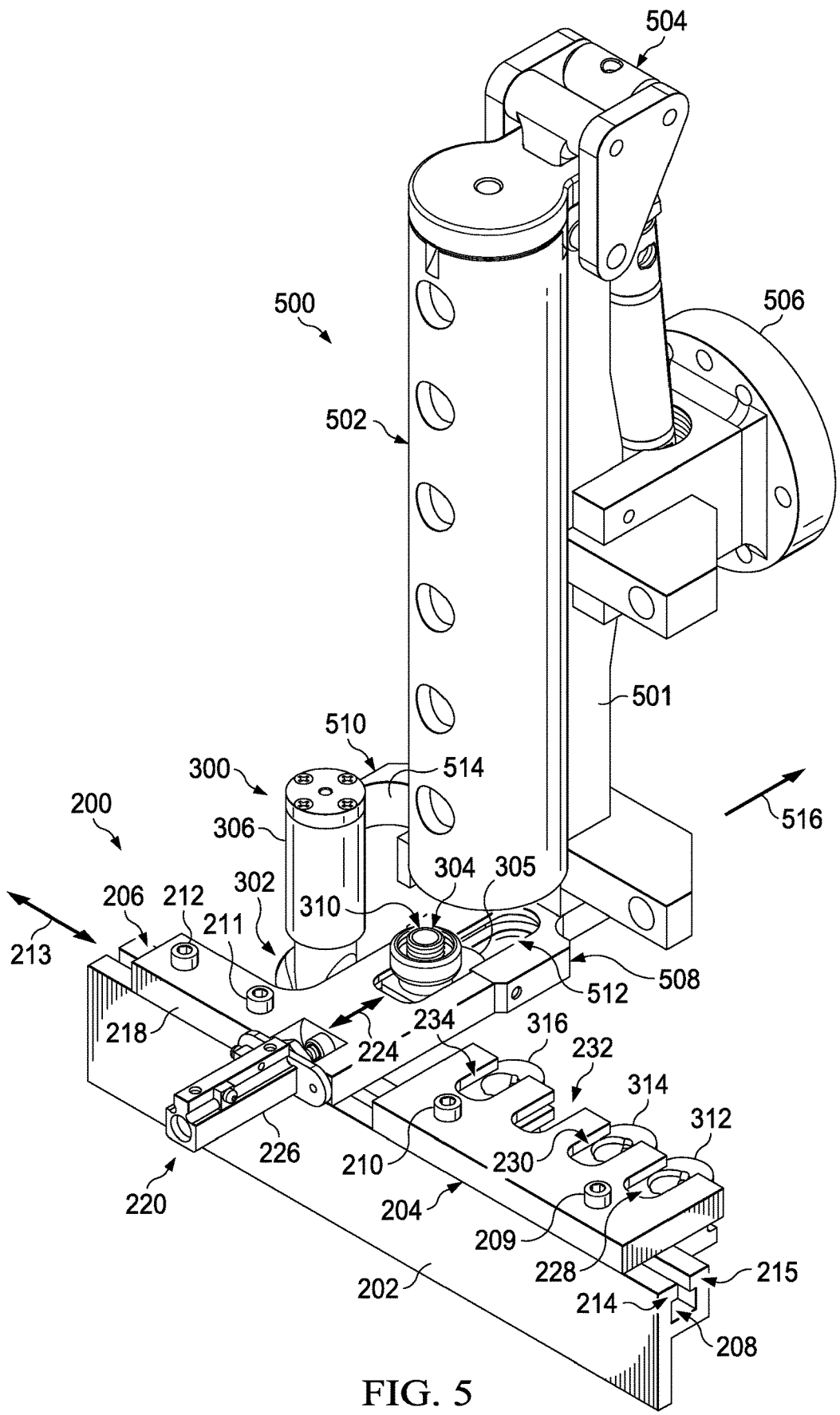
FIG. 5 is an illustration of a fluid dispensing system moved towards a retaining structure in accordance with an illustrative embodiment.

With reference now to FIG. 5, an illustration of a fluid dispensing system moved towards retaining structure 200 from FIG. 4 is depicted in accordance with an illustrative embodiment. In this illustrative example, fluid dispensing system 500 has been moved by a robotic device (not shown) towards retaining structure 200. In particular, fluid dispensing system 500 has been moved towards nozzle retaining structure 206 such that dispensing device 300, and thereby nozzle 302, may be attached to fluid dispensing system 500.

As depicted, fluid dispensing system 500 may include platform 501, fluid source holder 502, door mechanism 504, robotic attachment element 506, retaining element 508, and retaining element 510. Fluid source holder 502, door mechanism 504, robotic attachment element 506, retaining element 508, and retaining element 510 may all be associated with platform 501 and supported by platform 501.

Fluid source holder 502 may be configured to hold a fluid source (not shown). Door mechanism 504 may be operated to allow a fluid source (not shown) to be inserted into and removed from fluid source holder 502. Robotic attachment element 506 may be used for attaching platform 501 to the robotic device (not shown).

Retaining element 508 may have retaining area 512 configured to receive one portion of dispensing device 300. Retaining element 510 may have retaining area 514 configured to receive another portion of dispensing device 300. In this illustrative example, actuation device 220 may move dispensing device 300 in the direction of arrow 516 into retaining area 512.

Figure 6:
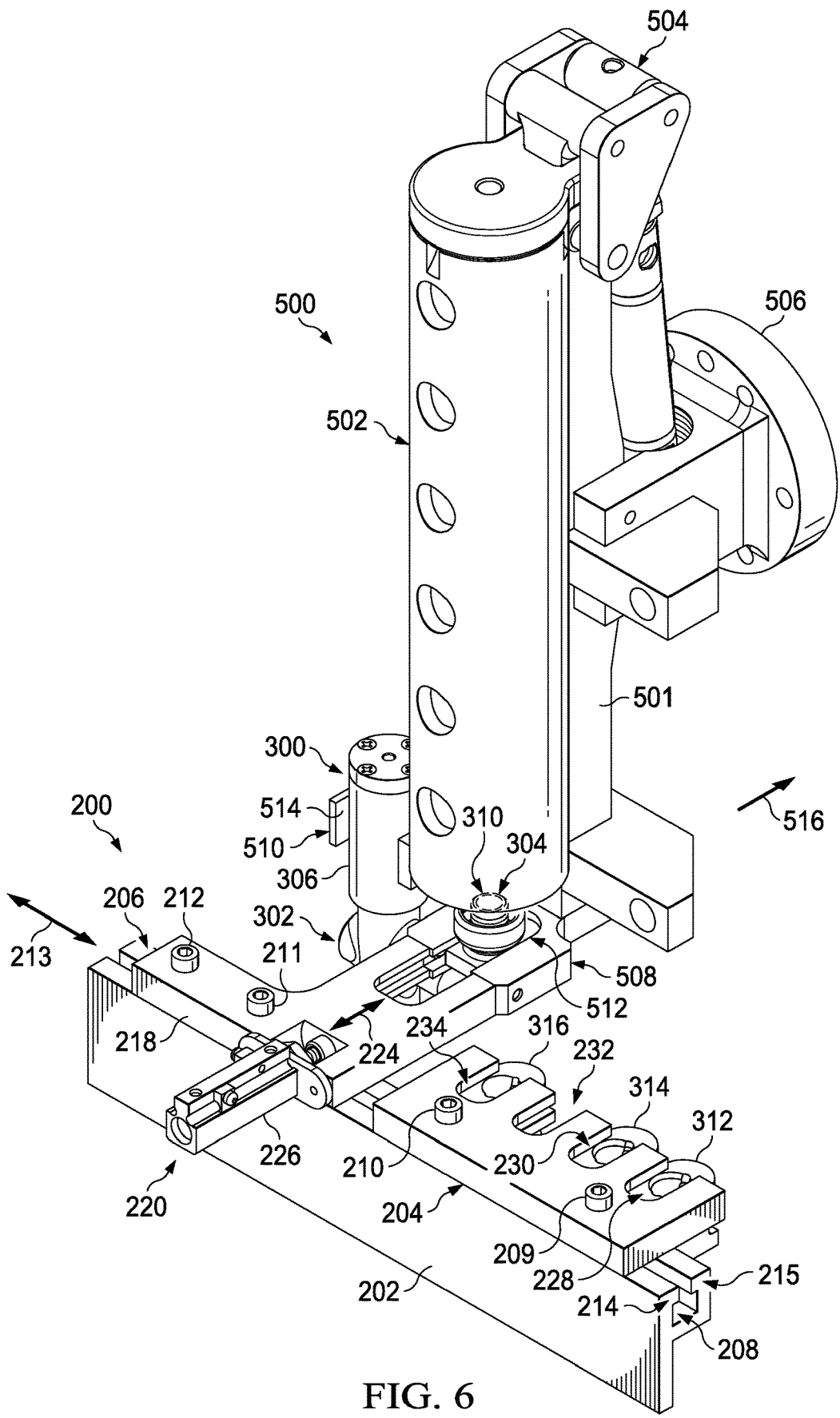
FIG. 6 is an illustration of a dispensing device moved into a retaining area of a fluid dispensing system in accordance with an illustrative embodiment.

With reference now to FIG. 6, an illustration of dispensing device 300 from FIG. 5 moved into retaining area 512 of fluid dispensing system 500 is depicted in accordance with an illustrative embodiment. In this illustrative example, dispensing device 300 has been moved into retaining area 512 of retaining element 508 of fluid dispensing system 500 by actuation device 220. Retaining element 508 may be configured to hold dispensing device 300 independently of nozzle retaining structure 206.

Figure 7:
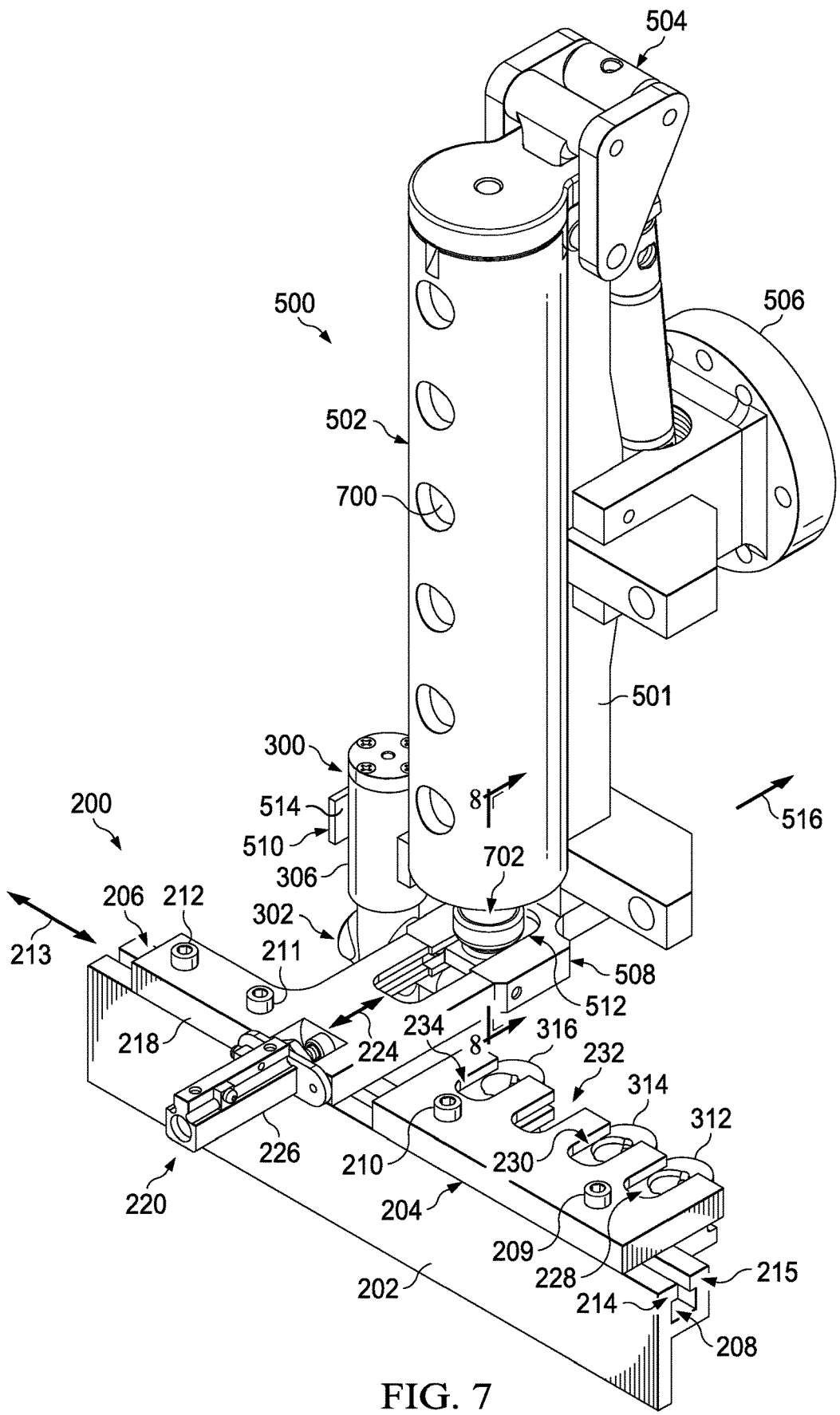
FIG. 7 is an illustration of a dispensing system being attached to a fluid dispensing system in accordance with an illustrative embodiment.

With reference now to FIG. 7, an illustration of dispensing device 300 being attached to fluid dispensing system 500 is depicted in accordance with an illustrative embodiment. In this illustrative example, fluid source holder 502 may hold sealant cartridge 700. Sealant cartridge 700 may be an example of one implementation for fluid source 118 in FIG. 1. Sealant cartridge 700 may have been inserted into fluid source holder 502 by a robotic device (not shown) using door mechanism 504.

Sealant cartridge 700 may be moved downwards towards attachment interface 304 (hidden in this view) to attach sealant cartridge 700 to dispensing device 300. In particular, end 702 of sealant cartridge 700 may be attached to attachment element 310 of attachment interface 304 (both hidden in this view).

Figure 8:
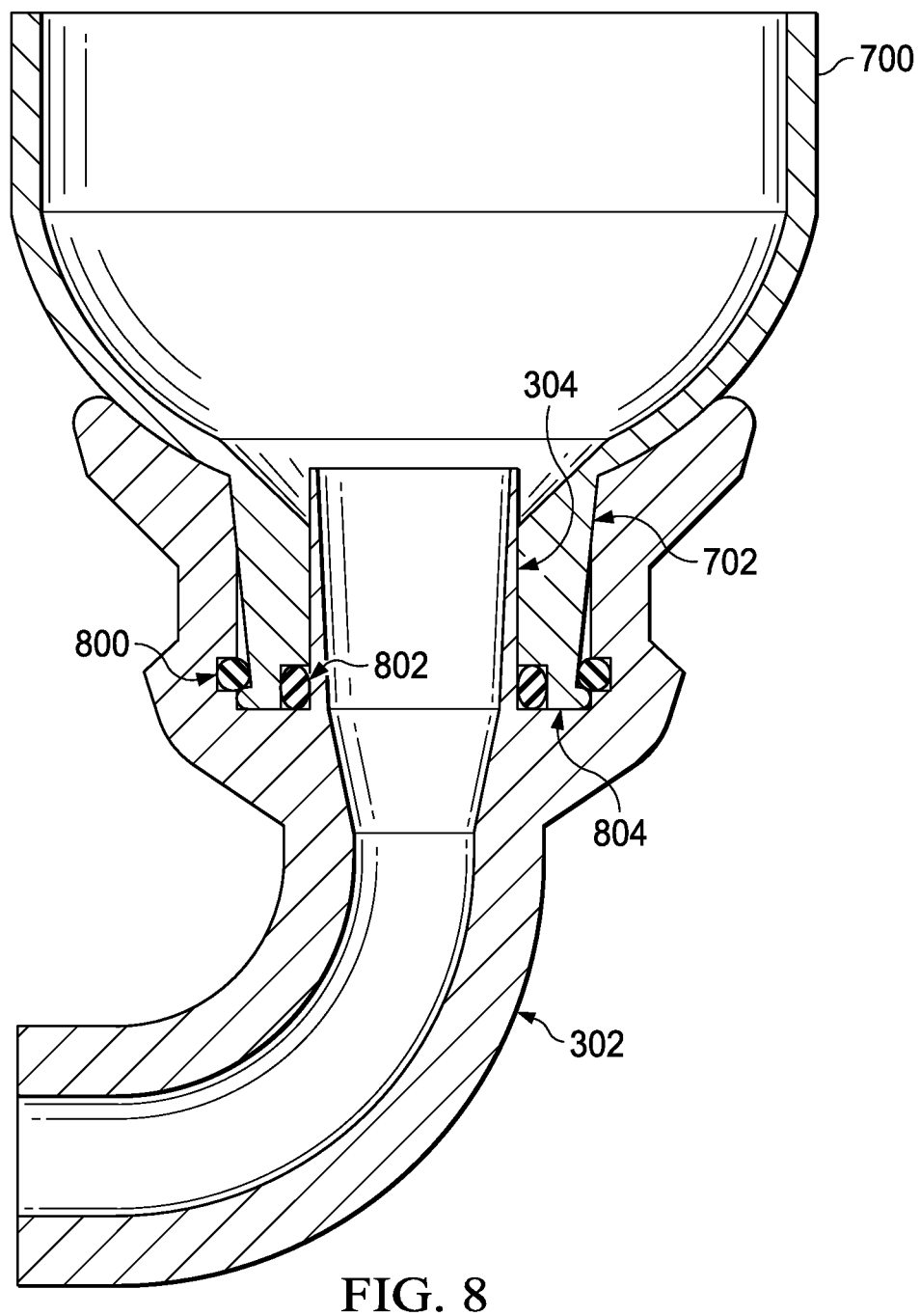
FIG. 8 is an illustration of a cross-sectional view of the attachment between a sealant cartridge and an attachment interface in accordance with an illustrative embodiment.

Turning now to FIG. 8, an illustration of a cross-sectional view of the attachment between sealant cartridge 700 and attachment interface 304 is depicted in accordance with an illustrative embodiment. In this illustrative example, a cross-sectional view of the attachment between sealant cartridge 700 and attachment interface 304 is depicted taken with respect to lines 7-7 in FIG. 7.

As depicted, bearing 800 and bearing 802 may be used to hold end 804 of sealant cartridge 700 in place within attachment interface 304. These bearings may take the form of, for example, without limitation, O-rings. In this illustrative example, bearing 800 and bearing 802 may be considered part of attachment interface 304.

Figure 9:
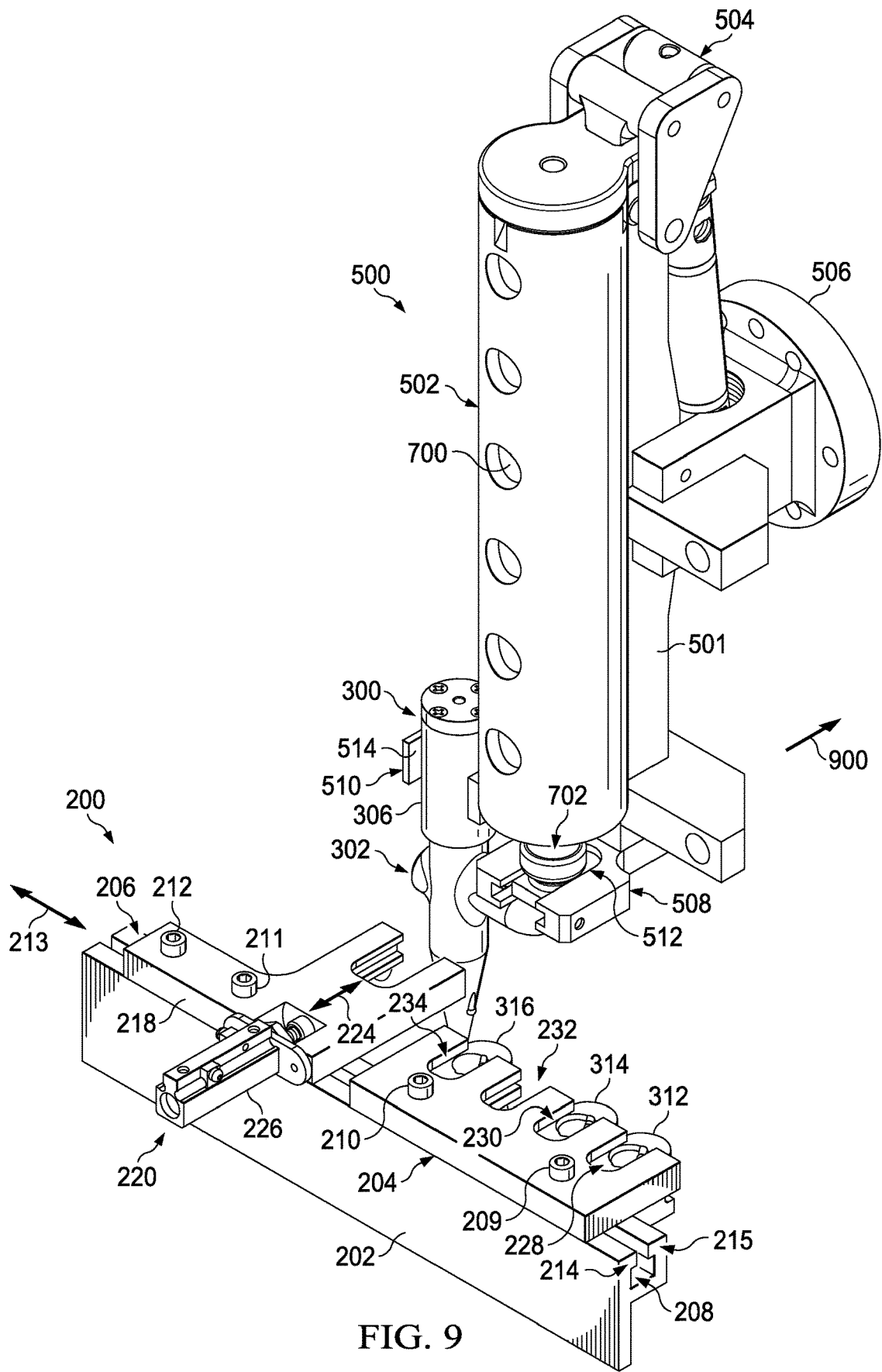
FIG. 9 is an illustration of a fluid dispensing system with a nozzle being moved away from a nozzle retaining structure in accordance with an illustrative embodiment.

With reference now to FIG. 9, an illustration of fluid dispensing system 500 with nozzle 302 being moved away from nozzle retaining structure 206 is depicted in accordance with an illustrative embodiment. In this illustrative example, a robotic device (not shown) may move fluid dispensing system 500 in the direction of arrow 900 away from nozzle retaining structure 206 now that dispensing device 300, and thereby, nozzle 302, has been attached to fluid dispensing system 500.

Figure 10:
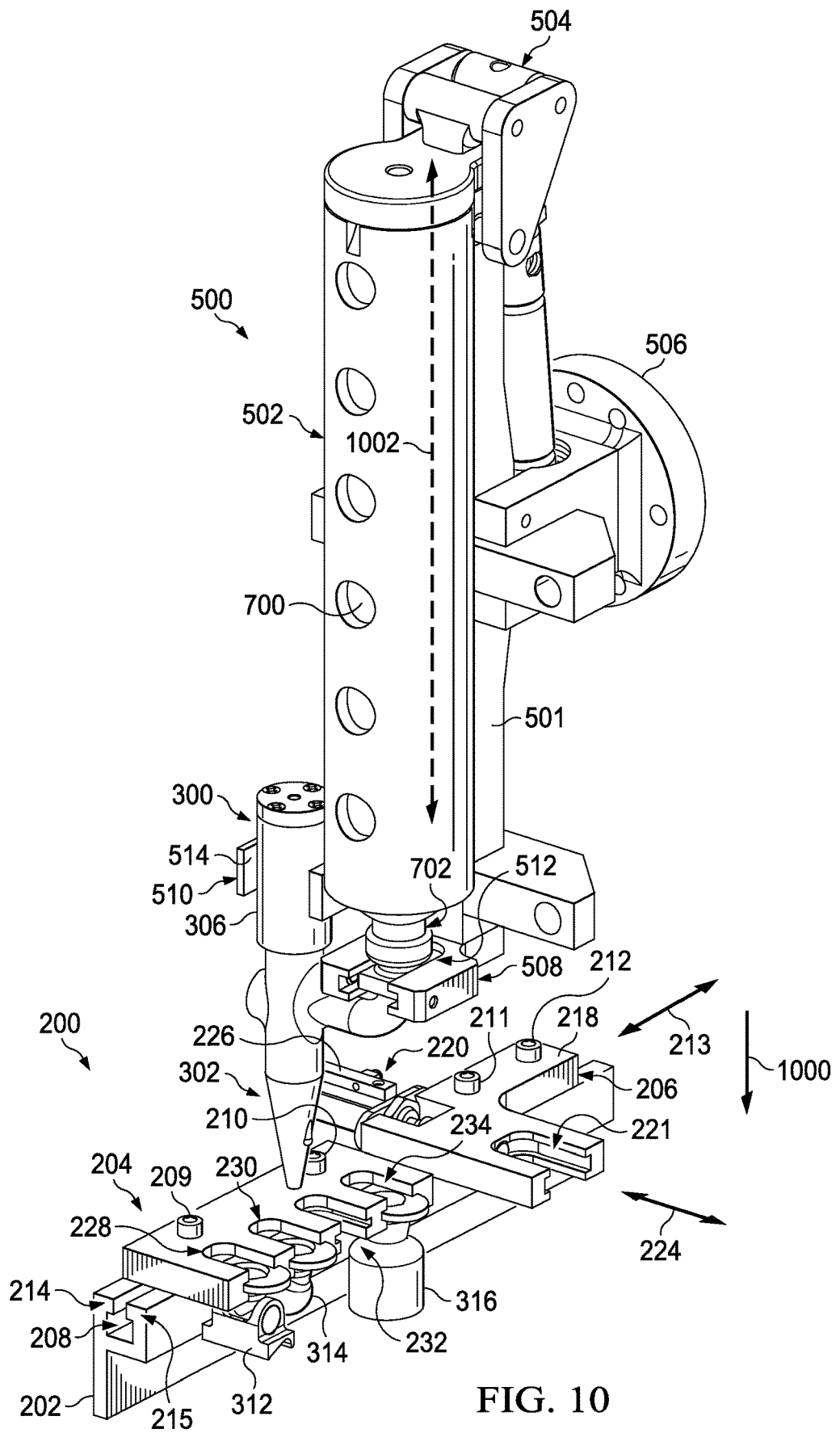
FIG. 10 is an illustration of a fluid dispensing system with a nozzle being moved towards a tip retaining structure in accordance with an illustrative embodiment.

With reference now to FIG. 10, an illustration of fluid dispensing system 500 with nozzle 302 being moved towards tip retaining structure 204 is depicted in accordance with an illustrative embodiment. A robotic device (not shown) may move fluid dispensing system 500 with nozzle 302 attached to fluid dispensing system 500 towards tip retaining structure 204. In this illustrative example, the robotic device (not shown) may also rotate fluid dispensing system 500 by about 90 degrees counterclockwise in a direction around vertical axis 1002 with respect to the orientation of fluid dispensing system 500 in FIG. 9.

In this manner, the robotic device may move fluid dispensing system 500 towards tip retaining structure 204 such that a tip may be selected for nozzle 302. Once a tip has been selected for nozzle 302, the robotic device may move fluid dispensing system 500 in the direction of arrow 1000 such that a tip may be attached to nozzle 302.

Figure 11:
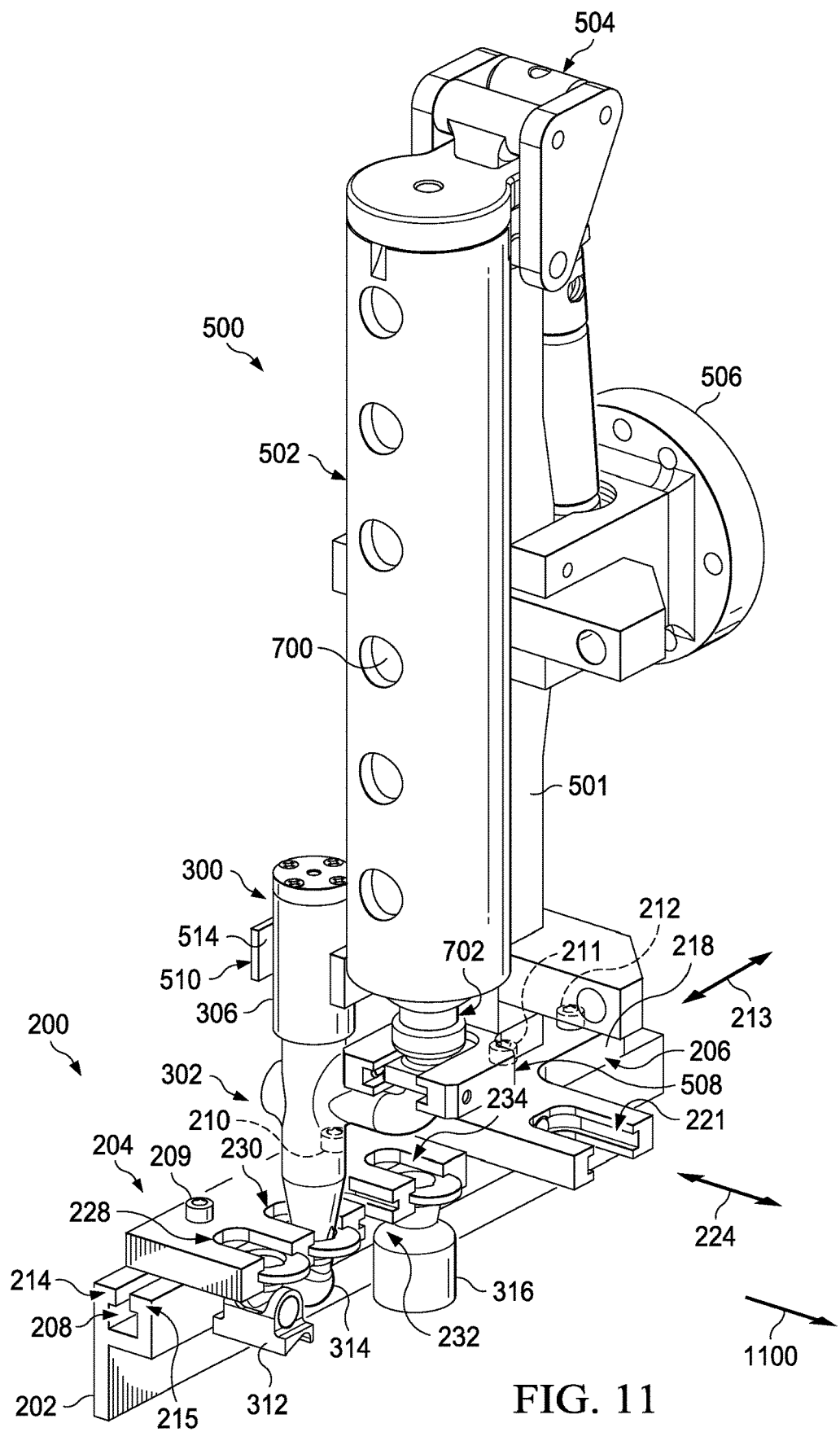
FIG. 11 is an illustration of a tip being attached to a nozzle in accordance with an illustrative embodiment.

With reference now to FIG. 11, an illustration of a tip being attached to nozzle 302 is depicted in accordance with an illustrative embodiment. In this illustrative example, tip 314 has been attached to nozzle 302. Once tip 314 has been attached to nozzle 302, a robotic device (not shown) may move fluid dispensing system 500 in the direction of arrow 1100 to move fluid dispensing system 500, with tip 314 attached to nozzle 302, away from tip retaining structure 204.

Figure 12:
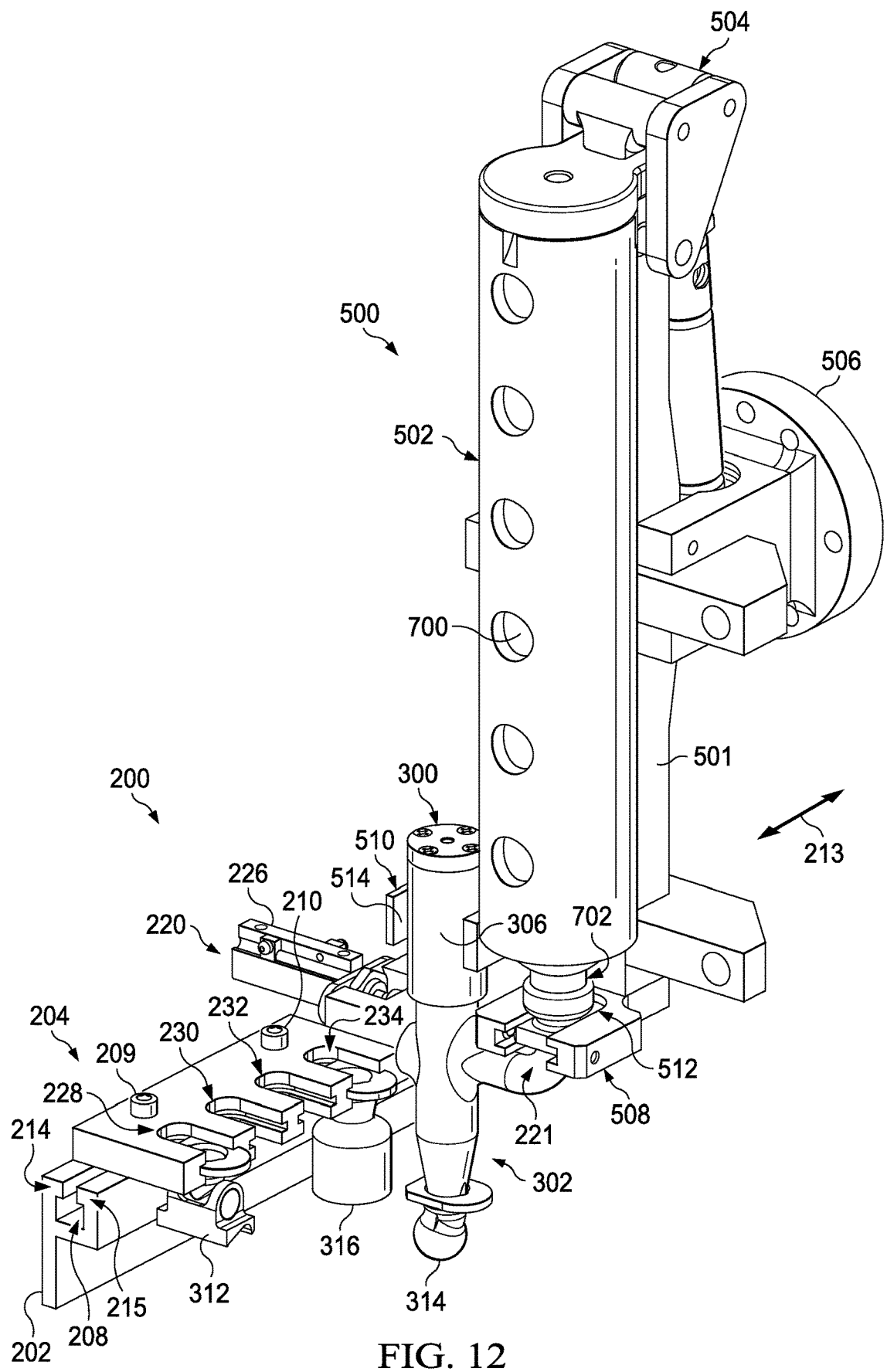
FIG. 12 is an illustration of a fully assembled fluid dispensing system in accordance with an illustrative embodiment.

Turning now to FIG. 12, an illustration of a fully assembled fluid dispensing system is depicted in accordance with an illustrative embodiment. In this illustrative example, fluid dispensing system 500 has been moved away from retaining structure 200. Fluid dispensing system 500, with nozzle 302 and tip 314 attached to nozzle 302, may be fully assembled and ready to perform sealant dispensing operations.

Figure 13:
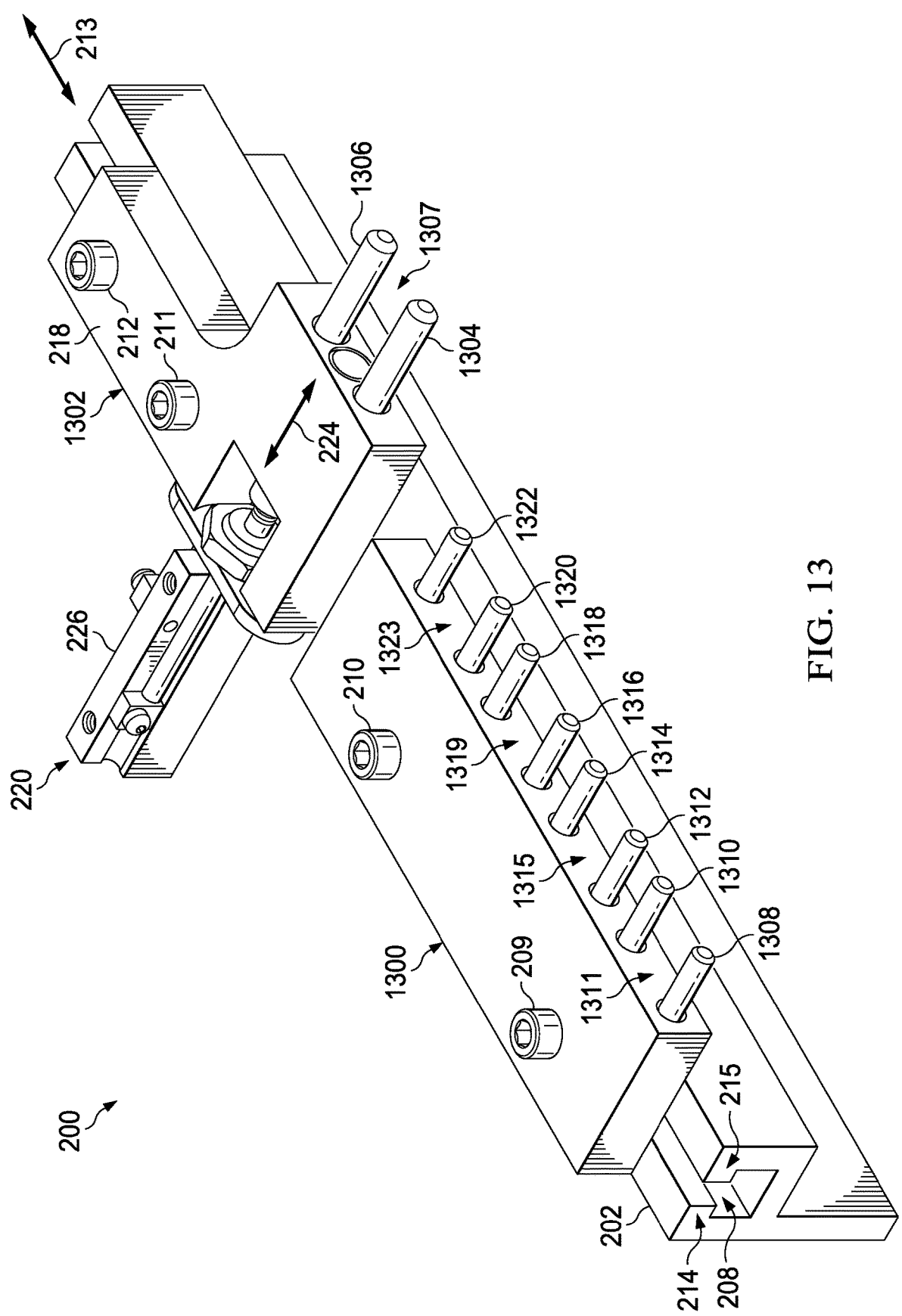
FIG. 13 is an illustration of a front isometric view of a base holding a different tip retaining structure and a different nozzle retaining structure in accordance with an illustrative embodiment.

With reference now to FIG. 13, an illustration of a front isometric view of base 202 from FIG. 2 holding a different tip retaining structure and a different nozzle retaining structure is depicted in accordance with an illustrative embodiment. In this illustrative example, tip retaining structure 1300 may be held by base 202 instead of tip retaining structure 204 from FIG. 2. Tip retaining structure 1300 may be another example of one implementation for tip retaining structure 132 in FIG. 1. Fastener 209 and fastener 210 may still be used to attach tip retaining structure 1300 to base 202 of retaining structure 200.

Further, nozzle retaining structure 1302 may be held by base 202 instead of nozzle retaining structure 206 from FIG. 2. Nozzle retaining structure 1302 may be another example of one implementation for nozzle retaining structure 134 in FIG. 1. Fastener 211 and fastener 212 may still be used to attach nozzle retaining structure 1302 to base 202 of retaining structure 200.

In this illustrative example, nozzle retaining structure 1302 may have member 1304 and member 1306. Member 1304 and member 1306 may form nozzle retaining area 1307 configured to receive a nozzle (not shown). Nozzle retaining area 1307 may be an example of one implementation for number of nozzle retaining areas 138 in FIG. 1.

Tip retaining structure 1300 may have members 1308, 1310, 1312, 1314, 1316, 1318, 1320, and 1322. Member 1308 and member 1310 may form tip retaining area 1311 configured to receive a tip (not shown). Member 1312 and member 1314 may form tip retaining area 1315 configured to receive a tip (not shown). Member 1316 and member 1318 may form tip retaining area 1319 configured to receive a tip (not shown). Member 1320 and member 1322 may form tip retaining area 1323 configured to receive a tip (not shown). Tip retaining areas 1311, 1315, 1319, and 1323 may be an example of one implementation for number of tip retaining areas 136 in FIG. 1.

Figure 14:
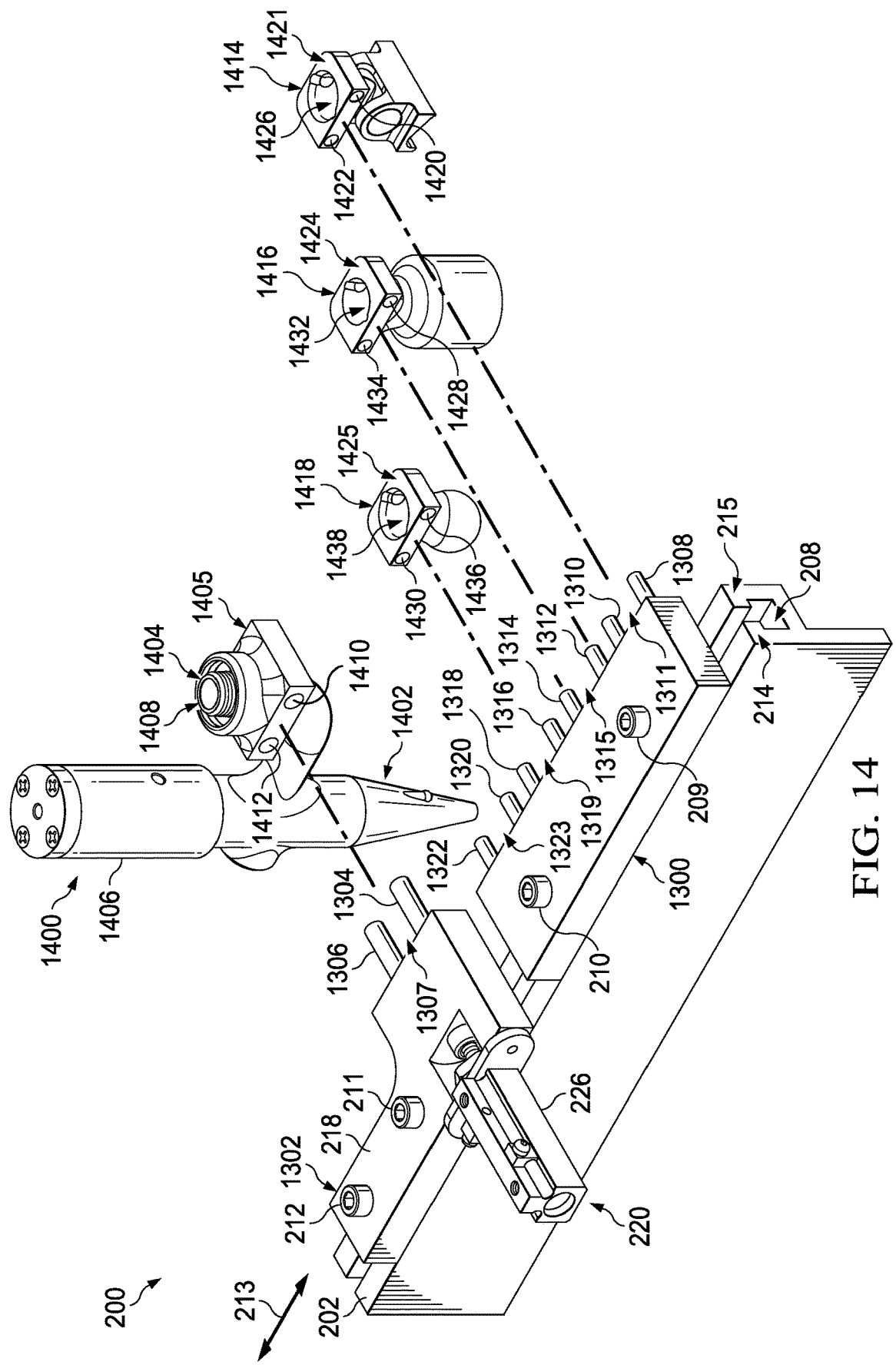
FIG. 14 is an illustration of a nozzle and tips being moved towards a retaining structure in accordance with an illustrative embodiment.

With reference now to FIG. 14, an illustration of a nozzle and tips being moved towards retaining structure 200 from FIG. 13 is depicted in accordance with an illustrative embodiment. A back isometric view of base 202 is depicted. In this illustrative example, dispensing device 1400 may be configured to be held by member 1304 and member 1306 of nozzle retaining structure 1302.

Dispensing device 1400 may be implemented in a manner similar to dispensing device 300 in FIG. 3. Dispensing device 1400 may be another example of one implementation for dispensing device 120 in FIG. 1. Dispensing device 1400 may include nozzle 1402, attachment interface 1404, protruding feature 1405, and control valve 1406. Nozzle 1402 may be another example of one implementation for nozzle 124 in FIG. 1. Further, control valve 1406 may be another example of one implementation for control valve 122 in FIG. 1. Protruding feature 1405 may be an example of another implementation for number of nozzle interface features 127 in FIG. 1.

Attachment interface 1404 may have attachment element 1408 configured for use in attaching a fluid dispensing system, such as fluid dispensing system 500 from FIG. 5, to dispensing device 1400. As depicted, protruding feature 1405 may have opening 1410 and opening 1412 configured to receive member 1304 and member 1306, respectively, of nozzle retaining structure 1302. In this manner, by sliding dispensing device 1400 towards nozzle retaining structure 1302 such that member 1304 is received within opening 1410 and member 1306 is received within opening 1412, dispensing device 1400, and thereby nozzle 1402, may be held by nozzle retaining structure 1302.

In this illustrative example, tips 1414, 1416, and 1418 are depicted. Tips 1414, 1416, and 1418 may be examples of one implementation for tips in number of tips 128 in FIG. 1. Tips 1414, 1416, and 1418 may have protruding elements 1421, 1424, and 1425, respectively. Protruding elements 1421, 1424, and 1425 may be examples of implementations for number of tip interface features 129 in FIG. 1.

Protruding element 1421 may have opening 1420 and opening 1422 configured to receive member 1308 and member 1310, respectively, of tip retaining structure 1300. Further, protruding element 1424 may have opening 1428 and opening 1434 configured to receive member 1312 and member 1314, respectively, of tip retaining structure 1300. Protruding element 1425 may have opening 1436 and opening 1430 configured to receive member 1316 and member 1318, respectively, of tip retaining structure 1300.

Further, in this illustrative example, tips 1414, 1416, and 1418 have openings 1426, 1432, and 1438, respectively, each configured to receive the end of a nozzle, such as nozzle 1402. Each of tips 1414, 1416, and 1418 may be configured to dispense fluid to form a deposit having a different shape.

Figure 15:
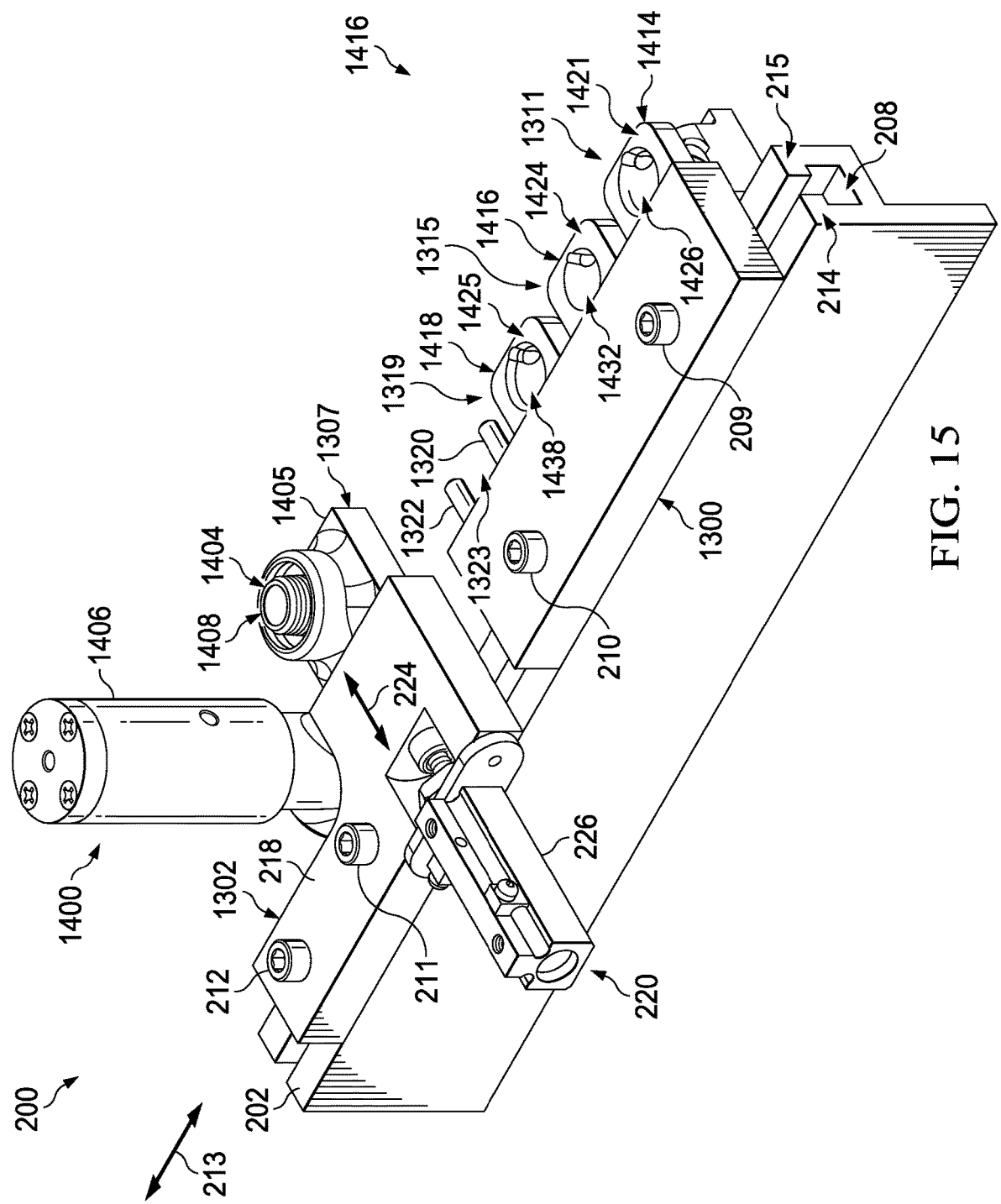
FIG. 15 is an illustration of a back isometric view of a nozzle retaining structure holding a dispensing device and a tip retaining structure holding tips in accordance with an illustrative embodiment.

With reference now to FIG. 15, an illustration of a back isometric view of nozzle retaining structure 1302 holding dispensing device 1400 and tip retaining structure 1300 holding tips 1414, 1416, and tip 1418 is depicted in accordance with an illustrative embodiment. As depicted, although members are used instead of grooves, tip retaining structure 1300 and nozzle retaining structure 1302 may be configured for use similar to tip retaining structure 204 and nozzle retaining structure 206, respectively, from FIG. 2.

Figure 16:
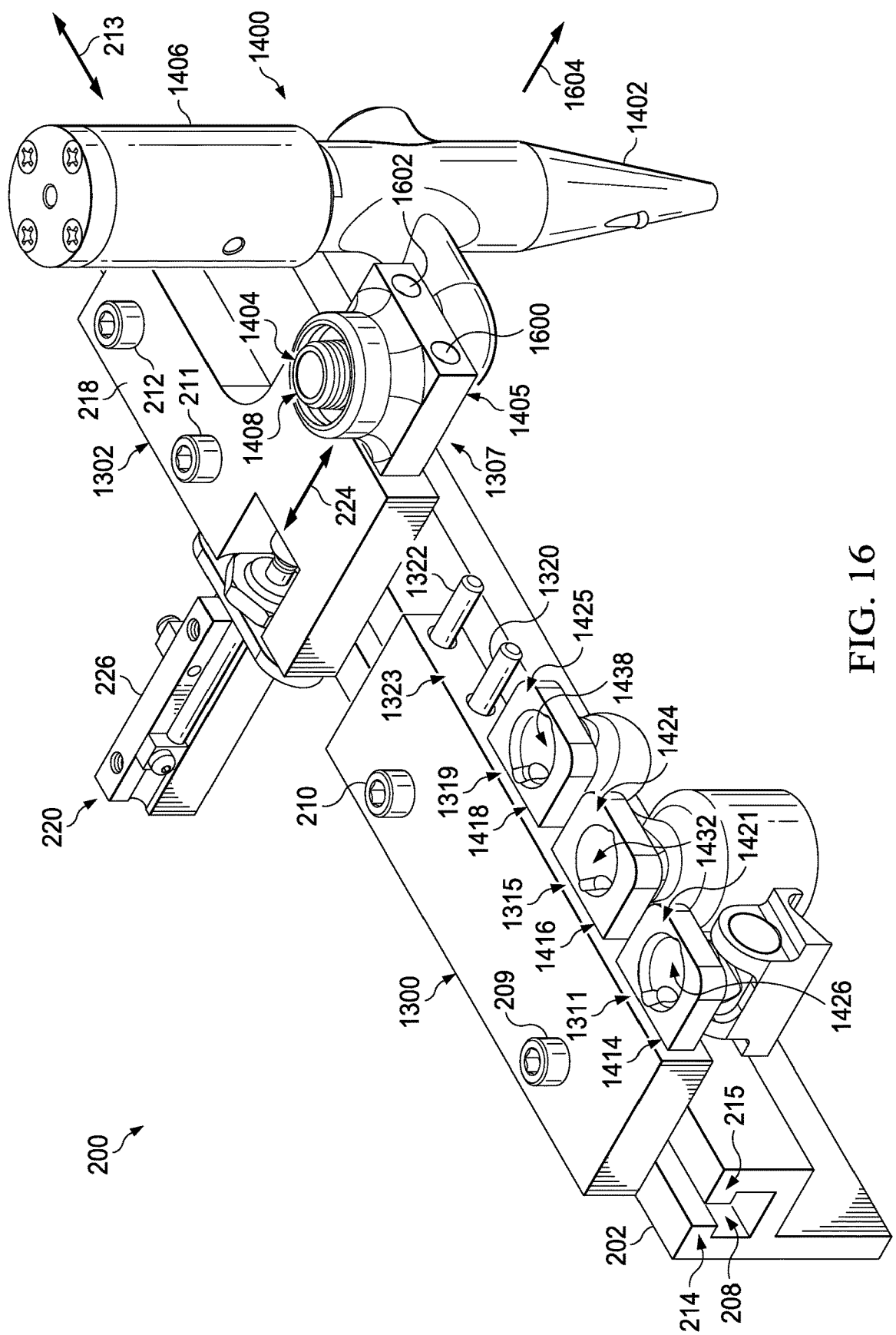
FIG. 16 is an illustration of a front isometric view of a tip retaining structure holding a dispensing device and a nozzle retaining structure holding tips in accordance with an illustrative embodiment.

Turning now to FIG. 16, an illustration of a front isometric view of tip retaining structure 1300 holding dispensing device 1400 and nozzle retaining structure 1302 holding tips 1414, 1416, and tip 1418 is depicted in accordance with an illustrative embodiment. In this illustrative example, opening 1600 and opening 1602 in protruding feature 1405 may be seen.

Opening 1600 and opening 1602 may be configured to receive members on a fluid dispensing system (not shown). Actuation device 220 may be configured to move dispensing device 1400, and thereby nozzle 1402, in the direction of arrow 1604 such that a member located on a fluid dispensing system (not shown) may be received in each of opening 1600 and opening 1602 to attach dispensing device 1400 to this fluid dispensing system.

Figure 17:
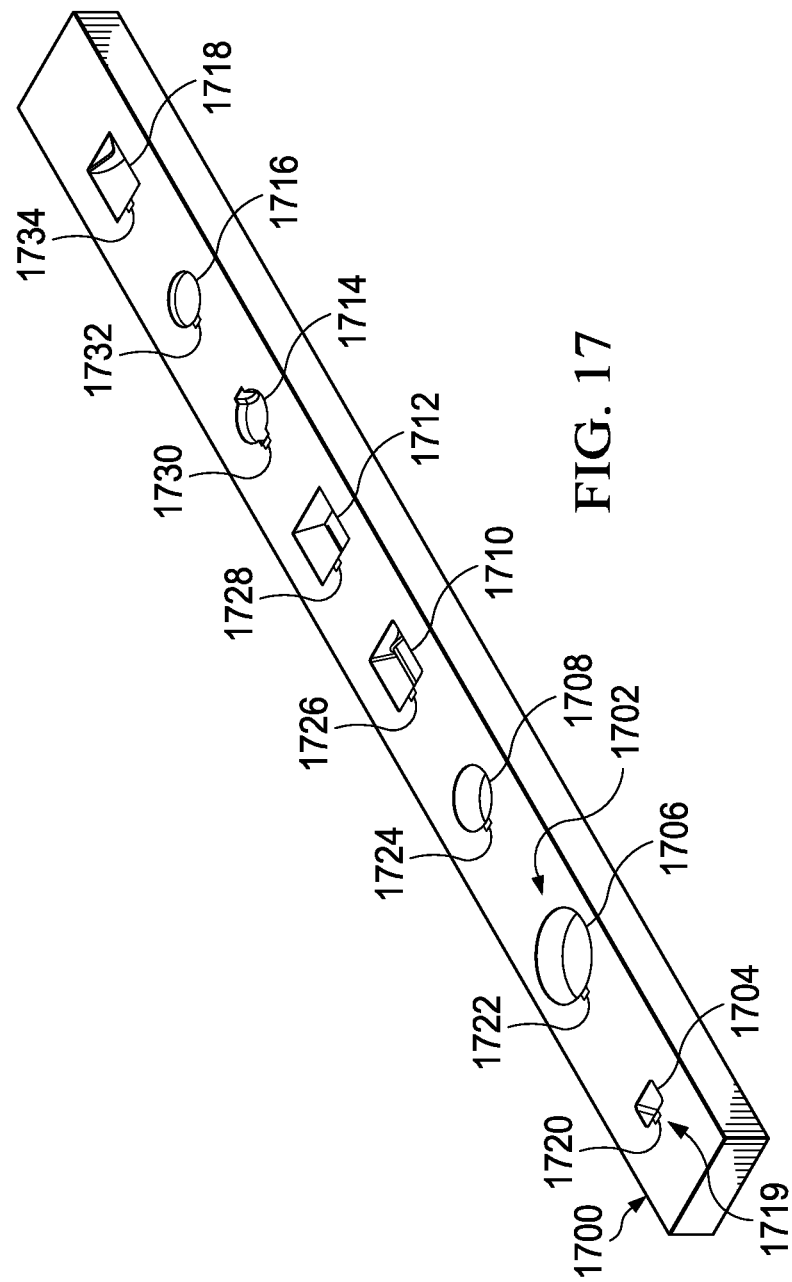
FIG. 17 is an illustration of a tip retaining structure in accordance with an illustrative embodiment.

With reference now to FIG. 17, an illustration of a tip retaining structure is depicted in accordance with an illustrative embodiment. In this illustrative example, tip retaining structure 1700 may be an example of one implementation for tip retaining structure 132 in FIG. 1. Tip retaining structure 1700 may take the form of a tray in this illustrative example.

As depicted, tip retaining structure 1700 may have number of tip retaining areas 1702. Number of tip retaining areas 1702 may include tip retaining areas 1704, 1706, 1708, 1710, 1712, 1714, 1716, and 1718. In this illustrative example, each one of tip retaining areas 1702 may be shaped and sized to hold a specific type of tip.

Radio frequency identification tags 1719 may be associated with number of tip retaining areas 1702. In particular, radio frequency identification tags 1719 may be an example of one implementation for a portion of plurality of radio frequency identification tags 146 in FIG. 1. Radio frequency identification tags 1719 may include radio frequency identification tags 1720, 1722, 1724, 1726, 1728, 1730, 1732, and 1734, which may be located at or near tip retaining areas 1704, 1706, 1708, 1710, 1712, 1714, 1716, and 1718, respectively. The radio frequency identification tag located at a particular tip retaining area may function as an identifier for the tip to be held within the particular tip retaining area. In particular, a detector (not shown), such as detector 144 in FIG. 1, may be used to identify tips (not shown) held within tip retaining structure 1700 based on radio frequency identification tags 1719.

Figure 18:
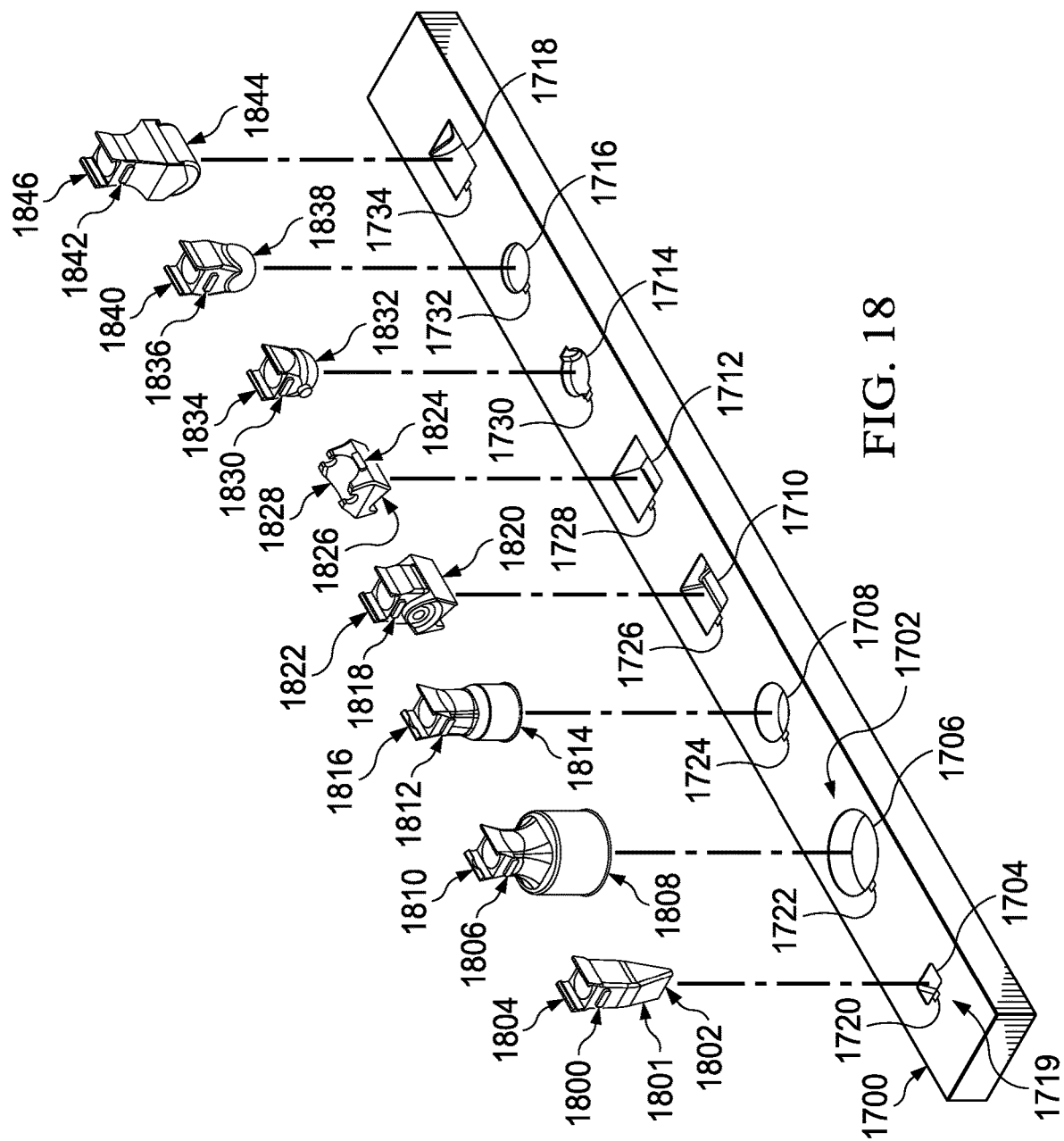
FIG. 18 is an illustration of a number of tips configured to be held by a tip retaining structure in accordance with an illustrative embodiment.

With reference now to FIG. 18, an illustration of a number of tips to be held by tip retaining structure 1700 from FIG. 17 is depicted in accordance with an illustrative embodiment. Number of tips 1801 may be an example of one implementation for number of tips 128 in FIG. 1. Number of tips 1801 may be configured to be held by tip retaining structure 1700 within number of tip retaining areas 1702.

In this illustrative example, tip 1800 may be configured to be held within tip retaining area 1704. In particular, end 1802 of tip 1800 may be inserted into tip retaining area 1704. End 1804 of tip 1800 may be used to attach tip 1800 to a nozzle, such as nozzle 1402 in FIG. 14.

Tip 1806 may be configured to be held within tip retaining area 1706. In particular, end 1808 of tip 1806 may be inserted into tip retaining area 1706. End 1810 of tip 1806 may be used to attach tip 1806 to a nozzle.

Further, tip 1812 may be configured to be held within tip retaining area 1708. In particular, end 1814 of tip 1812 may be inserted into tip retaining area 1708. End 1816 of tip 1812 may be used to attach tip 1812 to a nozzle. Tip 1818 may be configured to be held within tip retaining area 1710. End 1820 of tip 1818 may be inserted into tip retaining area 1708, while end 1822 of tip 1818 may be used to attach tip 1818 to a nozzle.

Tip 1824 may be configured to be held within tip retaining area 1712. Tip 1824 may have end 1826 configured for insertion into tip retaining area 1712 and end 1828 configured for attachment to a nozzle. Further, tip 1830 may be configured to be held within tip retaining area 1714. Tip 1830 may have end 1832 configured for insertion into tip retaining area 1714 and end 1834 configured for attachment to a nozzle.

Tip 1836 may be configured for insertion within tip retaining area 1716. Tip 1836 may have end 1838 configured for insertion into tip retaining area 1716 and end 1840 configured for attachment to a nozzle. Lastly, tip 1842 may be configured for insertion within tip retaining area 1718. Tip 1842 may have end 1844 configured for insertion into tip retaining area 1817 and end 1846 configured for attachment to a nozzle.

Figure 19:
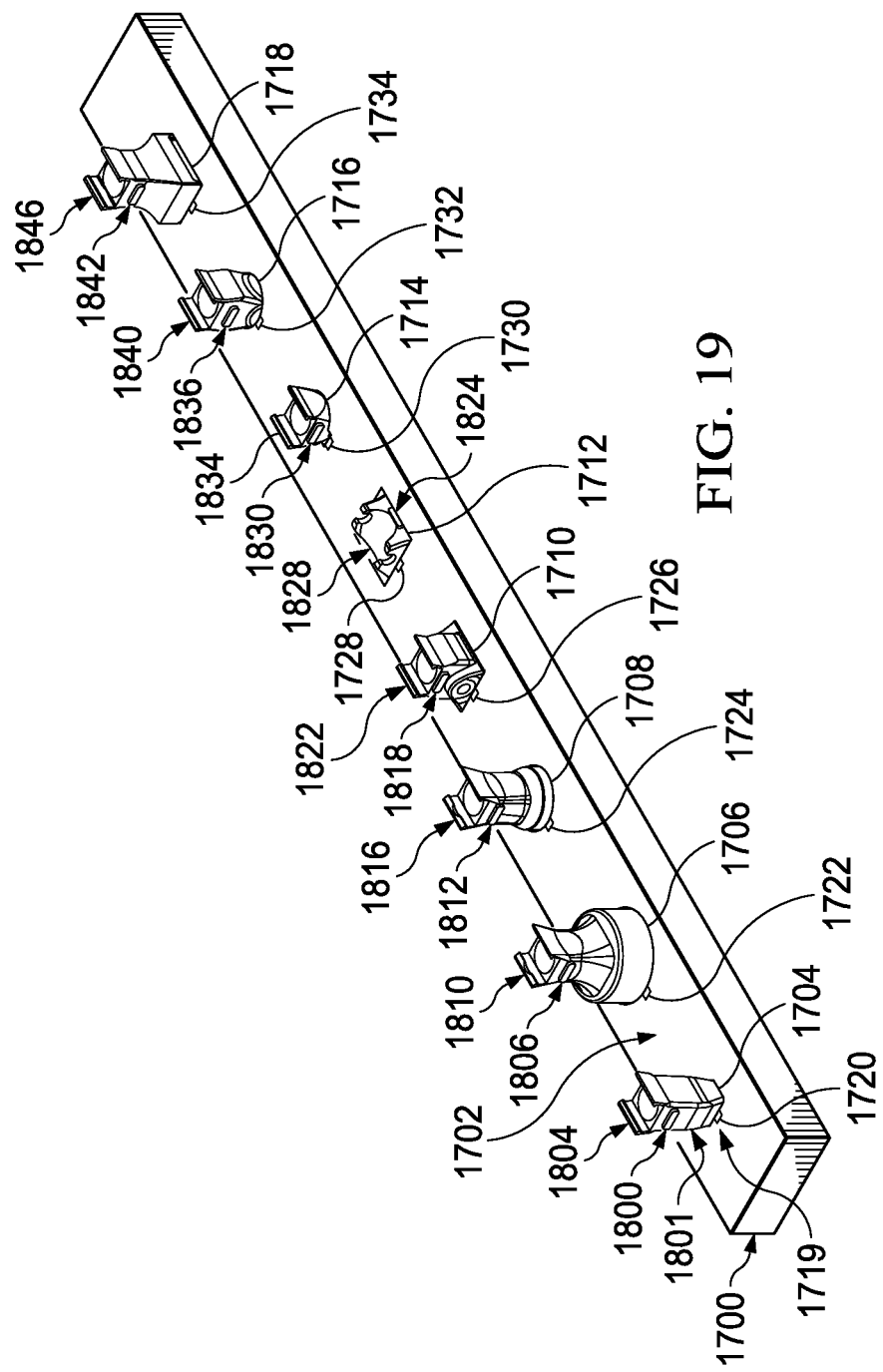
FIG. 19 is an illustration of a tip retaining structure holding tips in accordance with an illustrative embodiment.

Turning now to FIG. 19, an illustration of tip retaining structure 1700 from FIG. 17 holding number of tips 1900 is depicted in accordance with an illustrative embodiment. In this illustrative example, tips 1800, 1806, 1812, 1818, 1824, 1830, 1836, and 1842 from FIG. 18 have been retained by tip retaining structure 1700 within number of tip retaining areas 1702.

Figure 20:
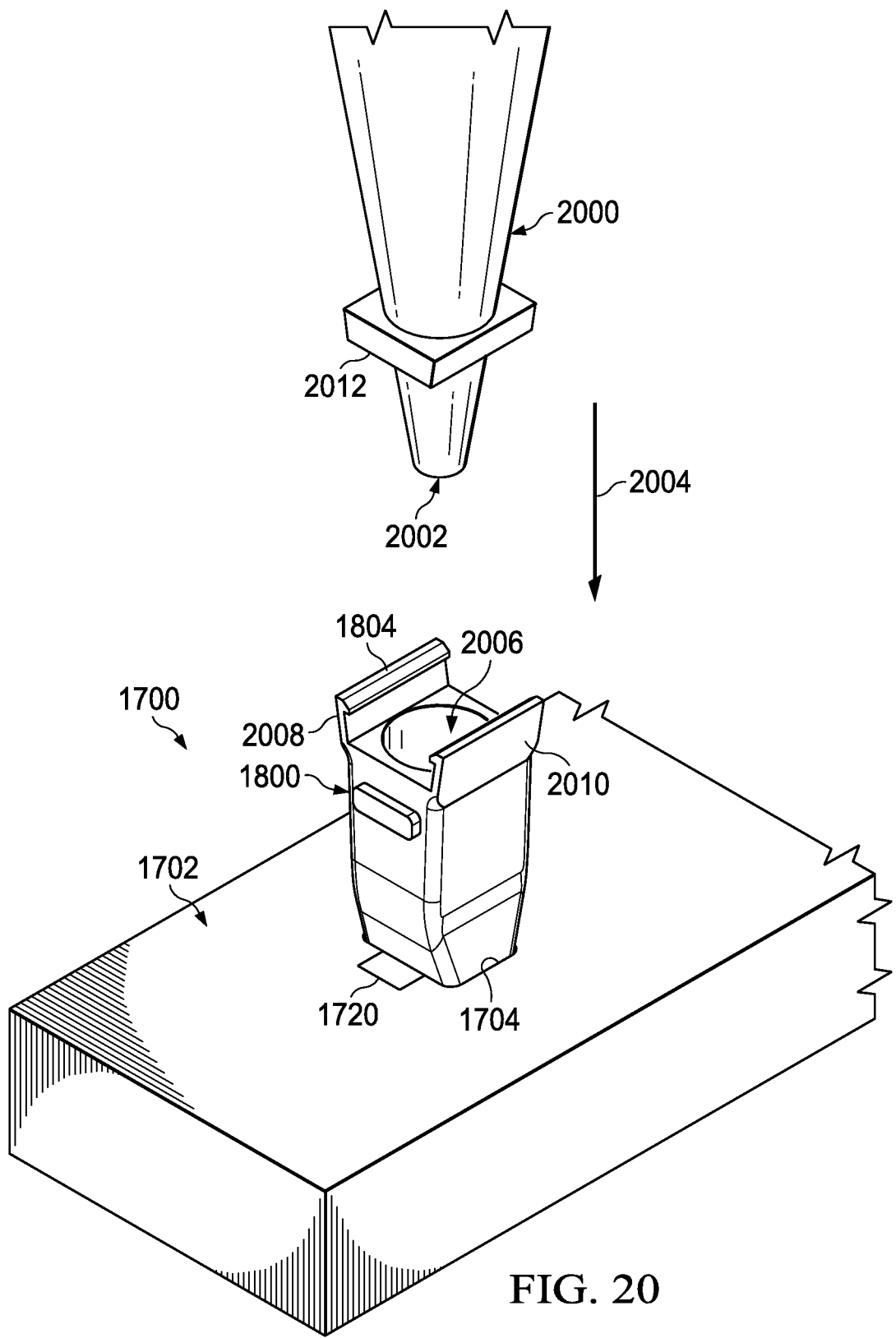
FIG. 20 is an illustration of a nozzle being moved over a tip in accordance with an illustrative embodiment.

With reference now to FIG. 20, an illustration of a nozzle being moved over a tip is depicted in accordance with an illustrative embodiment. In this illustrative example, nozzle 2000 may be moved over tip 1800 held by tip retaining structure 1700 from FIG. 19. Nozzle 2000 may be an example of one implementation for nozzle 124 in FIG. 1.

Nozzle 2000 may have end 2002. Nozzle 2000 may be moved over tip 1800. A detector (not shown), associated with either nozzle 2000 or the dispensing device (not shown) to which nozzle 2000 belongs, may be used to read the signals being sent from radio frequency identification tag 1720 corresponding to tip 1800. The detector (not shown) may then send data about the signal read from radio frequency identification tag 1720 to a controller (not shown) that may determine whether tip 1800 is to be selected for use. If tip 1800 is selected, nozzle 2000 may be moved in the direction of arrow 2004 to attach nozzle 2000 to tip 1800.

As depicted, tip 1800 may have opening 2006 at end 1804 of tip 1800. Opening 2006 may be configured to receive end 2002 of nozzle 2000. Further, tip 1800 may have interface feature 2008 and interface feature 2010, which may be an example of one implementation for number of tip interface features 129 in FIG. 1. Nozzle 2000 may have interface feature 2012. Interface feature 2012 may be an example of one implementation for number of nozzle interface features 127 in FIG. 1.

Interface feature 2008 and interface feature 2010 may be configured to engage interface feature 2012 of nozzle 2000 to attach nozzle 2000 to tip 1800. In particular, when nozzle 2000 is moved in the direction of arrow 2004 into opening 2006 of tip 1800, interface feature 2012 of nozzle 2000 may form a snap fit with interface feature 2008 and interface feature 2010 of tip 1800.

Figure 21:
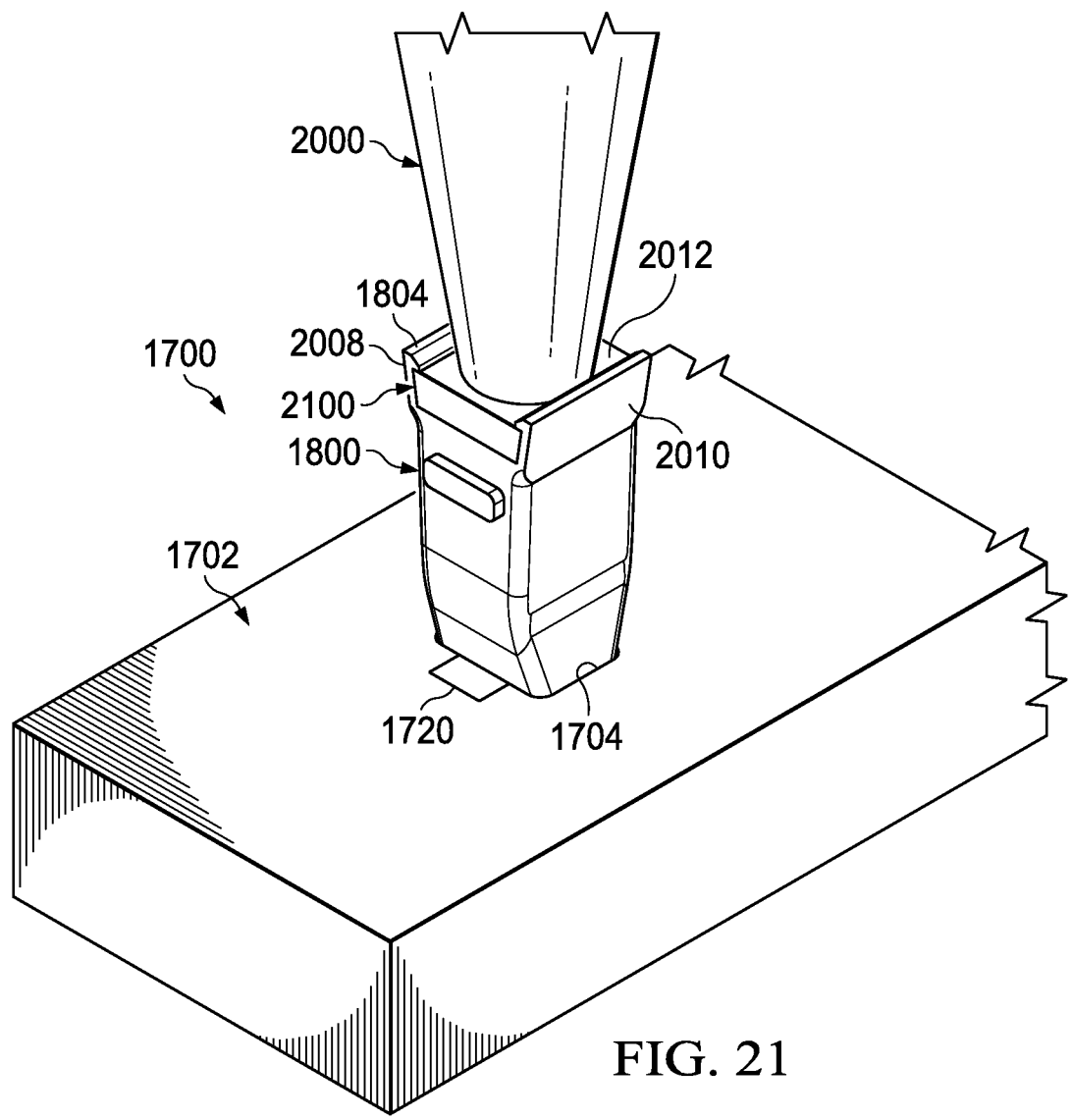
FIG. 21 is an illustration of a snap fit between a nozzle and a tip in accordance with an illustrative embodiment.

With reference now to FIG. 21, an illustration of a snap fit between a nozzle and a tip is depicted in accordance with an illustrative embodiment. In this illustrative example, snap fit 2100 has been formed between nozzle 2000 and tip 1800 from FIG. 20. Nozzle 2000, with tip 1800 attached to nozzle 2000, may be moved away from tip retaining structure 1700 and then used for sealant dispensing operations.

The illustrations in FIGS. 2-21 are not meant to imply physical or architectural limitations to the manner in which an illustrative embodiment may be implemented. Other components in addition to or in place of the ones illustrated may be used. Some components may be optional.

The different components shown in FIGS. 2-21 may be illustrative examples of how components shown in block form in FIG. 1 can be implemented as physical structures. Additionally, some of the components in FIGS. 2-21 may be combined with components in FIG. 1, used with components in FIG. 1, or a combination of the two.

Figure 22:
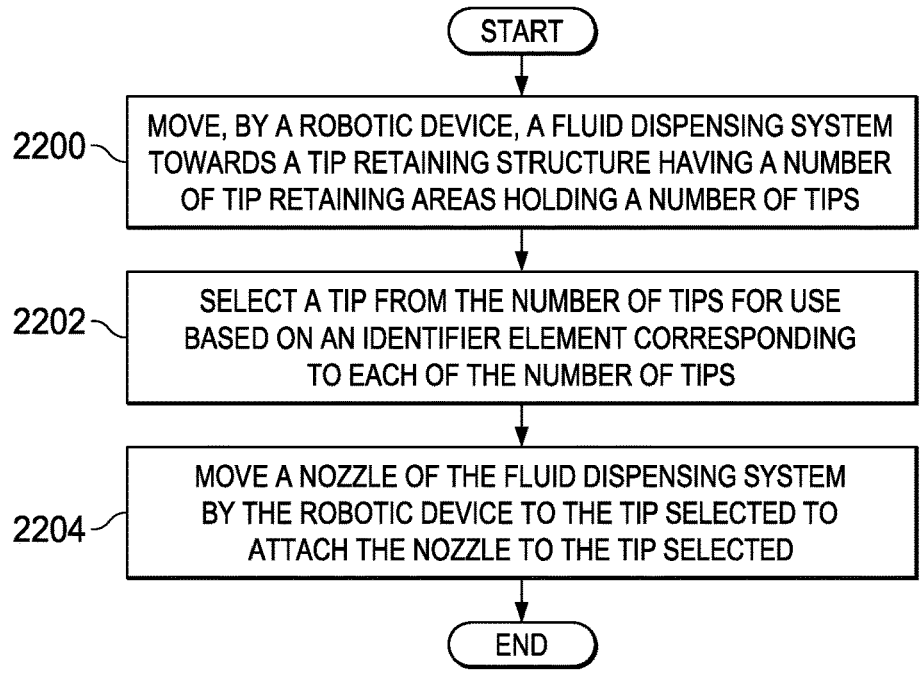
FIG. 22 is an illustration of a process for attaching a tip to a nozzle of a fluid dispensing system in the form of a flowchart in accordance with an illustrative embodiment.

With reference now to FIG. 22, an illustration of a process for attaching a tip to a nozzle of a fluid dispensing system is depicted in the form of a flowchart in accordance with an illustrative embodiment. The process illustrated in FIG. 22 may be implemented to attach one of number of tips 128 to nozzle 124 of fluid dispensing system 102 in FIG. 1.

The process may begin by moving, by robotic device 105, fluid dispensing system 102 towards tip retaining structure 132 having number of tip retaining areas 136 holding number of tips 128 (operation 2200). A tip from number of tips 128 may be selected for use based on an identifier element corresponding to each of number of tips 128 (operation 2202). Nozzle 124 of fluid dispensing system 102 may be moved by robotic device 105 to the tip selected to attach nozzle 124 to the tip selected (operation 2204), with the process terminating thereafter.

Figure 23:
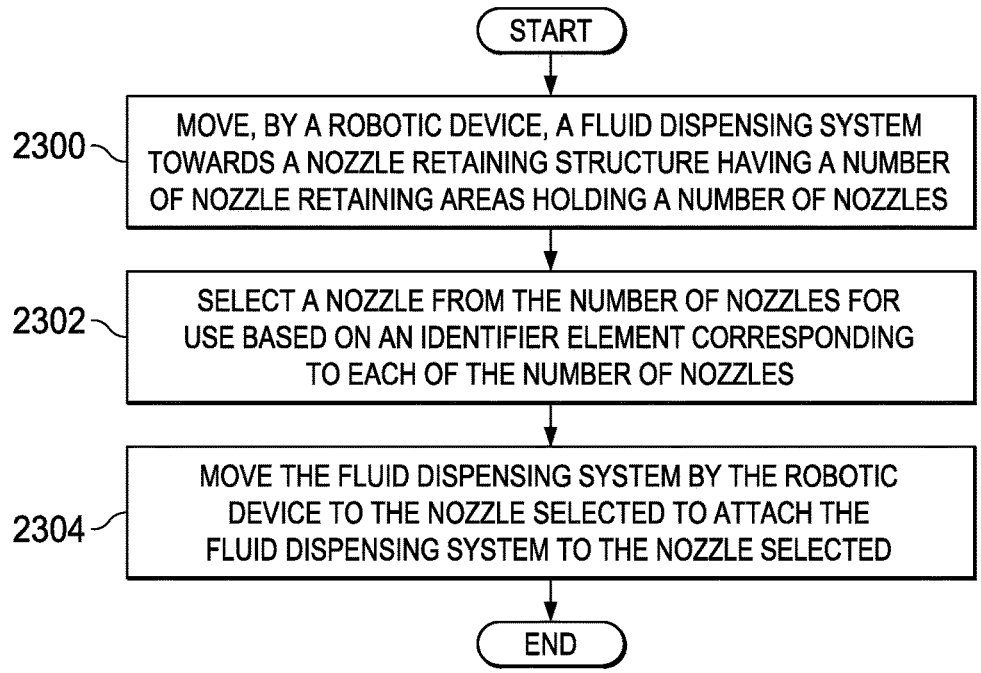
FIG. 23 is an illustration of a process for attaching a nozzle to a fluid dispensing system in the form of a flowchart in accordance with an illustrative embodiment.

With reference now to FIG. 23, an illustration of a process for attaching a nozzle to a fluid dispensing system is depicted in the form of a flowchart in accordance with an illustrative embodiment. The process illustrated in FIG. 23 may be implemented to attach one of number of nozzles 125 to fluid dispensing system 102 in FIG. 1.

The process may begin by moving, by robotic device 105, fluid dispensing system 102 towards nozzle retaining structure 134 having number of nozzle retaining areas 138 holding number of nozzles 125 (operation 2300). A nozzle from number of nozzles 125 may be selected for use based on an identifier element corresponding to each of number of nozzles 125 (operation 2302). Fluid dispensing system 102 may be moved by robotic device 105 to the nozzle selected to attach fluid dispensing system 102 to the nozzle selected (operation 2304), with the process terminating thereafter.

Illustrative embodiments of the disclosure may be described in the context of aircraft manufacturing and service method 2400 as shown in FIG. 24 and aircraft 2500 as shown in FIG. 25. Turning first to FIG. 24, an illustration of an aircraft manufacturing and service method is depicted in the form of a flowchart in accordance with an illustrative embodiment. During pre-production, aircraft manufacturing and service method 2400 may include specification and design 2402 of aircraft 2500 in FIG. 25 and material procurement 2404.

During production, component and subassembly manufacturing 2406 and system integration 2408 of aircraft 2500 in FIG. 25 takes place. Thereafter, aircraft 2500 in FIG. 25 may go through certification and delivery 2410 in order to be placed in service 2412. While in service 2412 by a customer, aircraft 2500 in FIG. 25 is scheduled for routine maintenance and service 2414, which may include modification, reconfiguration, refurbishment, and other maintenance or service.

Each of the processes of aircraft manufacturing and service method 2400 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 25, an illustration of an aircraft is depicted in which an illustrative embodiment may be implemented. In this example, aircraft 2500 is produced by aircraft manufacturing and service method 2400 in FIG. 24 and may include airframe 2502 with plurality of systems 2504 and interior 2506. Examples of systems 2504 include one or more of propulsion system 2508, electrical system 2510, hydraulic system 2512, and environmental system 2514. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 2400 in FIG. 24. In particular, retaining structure 130 from FIG. 1 may be used to hold number of nozzles 125 and/or number of tips 128 for use with fluid dispensing system 102 in FIG. 1.

Using plurality of identifier elements 142, the nozzle used for fluid dispensing system 102 and the tip used for that nozzle may be exchanged during any one of the stages of aircraft manufacturing and service method 2400. For example, without limitation, a nozzle and/or tip for a nozzle may be exchanged for fluid dispensing system 102 during at least one of component and subassembly manufacturing 2406, system integration 2408, in service 2412, routine maintenance and service 2414, or some other stage of aircraft manufacturing and service method 2400.

Further, fluid dispensing system 102 in FIG. 1 may be configured to select a nozzle from number of nozzles 125 held by retaining structure 130 and/or a tip for the selected nozzle from number of tips 128 held by retaining structure 130 for dispensing fluid 104 on one or more structures of aircraft 2500. For example, without limitation, fluid dispensing system 102 may select a nozzle and/or tip held by retaining structure 130 for use in dispensing sealant material 114 onto one or more structures of airframe 2502 of aircraft 2500.

In one illustrative example, components or subassemblies produced in component and subassembly manufacturing 2406 in FIG. 24 may be fabricated or manufactured in a manner similar to components or subassemblies produced while aircraft 2500 is in service 2412 in FIG. 24. As yet another example, one or more apparatus embodiments, method embodiments, or a combination thereof may be utilized during production stages, such as component and subassembly manufacturing 2406 and system integration 2408 in FIG. 24. One or more apparatus embodiments, method embodiments, or a combination thereof may be utilized while aircraft 2500 is in service 2412 and/or during maintenance and service 2414 in FIG. 24. The use of a number of the different illustrative embodiments may substantially expedite the assembly of and/or reduce the cost of aircraft 2500.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus that comprises:
  a dispensing device that comprises a nozzle, a control valve, a protruding element and an attachment interface, wherein the protruding element protrudes from the attachment interface, and wherein the attachment interface and the protruding element protrude from the control valve;
  a nozzle retaining structure that comprises a nozzle retaining area, wherein the nozzle retaining area contains a groove configured to receive the protruding element;
  a tip retaining structure that comprises a tip retaining area configured to hold a tip for receiving the nozzle, wherein the tip comprises a protruding feature, and wherein the tip retaining structure contains a tip retaining groove that is configured to receive the protruding feature;
  an actuation device associated with the nozzle retaining structure and configured to move the protruding element of the dispensing device along a first axis to engage a retaining element of a fluid dispensing system such that the attachment interface allows fluid to flow from the fluid dispensing system to the attachment interface; and
  wherein the tip is configured to engage the nozzle when the nozzle is aligned above the tip by the fluid dispensing system moving the nozzle along a second axis and then inserted downward by the fluid dispensing system along a third axis until the tip is secured to the nozzle.

2. The apparatus of claim 1, wherein a number of tips are spatially arrayed in a row by the tip retaining structure; and
  wherein the tip is selected from the number of tips for engagement with the nozzle.

3. The apparatus of claim 1, wherein each tip retaining area is configured to have a shape and size configured to receive a particular type of tip.

4. The apparatus of claim 3 further comprising:
  a robotic device associated with the fluid dispensing system to move the fluid dispensing system to the tip.

5. The apparatus of claim 1, wherein a cavity comprises an opening configured to receive a cone shaped portion of the nozzle.

6. The apparatus of claim 1, wherein the fluid dispensing system is configured for attachment to a robotic device configured to control movement of the fluid dispensing system.

7. A nozzle and tip exchange system comprising:
  a dispensing device that comprises a nozzle, a control valve, a protruding element, and an attachment interface, wherein the protruding element protrudes from the attachment interface, and wherein the attachment interface and protruding element protrude from the control valve;
  a tip retaining structure that comprises a number of tip retaining areas configured to hold a number of tips, wherein each tip of the number of tips comprises a protruding feature, and wherein the tip retaining structure contains a tip retaining groove that is configured to receive the protruding feature;
  a nozzle retaining structure that comprises a number of nozzle retaining areas configured to hold a number of nozzles, wherein each of the number of nozzle retaining area areas contains a groove configured to receive the protruding element,
  a base configured to hold the tip retaining structure and the nozzle retaining structure; and
  a fluid dispensing system configured to move the nozzle from the nozzle retaining structure along a first axis, move the nozzle to the tip retaining structure along a second axis, and to engage the nozzle with one of the number of tips along a third axis.

8. The nozzle and tip exchange system of claim 7 further comprising:
a number of nozzle identifier elements corresponding to the number of nozzles in which the nozzle from the number of nozzles is selected for use with the fluid dispensing system based on the number of nozzle identifier elements corresponding to the number of nozzles.

9. The nozzle and tip exchange system of claim 8, wherein the number of nozzle identifier elements is implemented using a number of radio frequency identification tags.

10. The nozzle and tip exchange system of claim 8 further comprising:
a number of tip identifier elements, wherein the fluid dispensing system is configured to select one of the number of tips for the nozzle based on the number of tip identifier elements corresponding to the number of tips.

11. The nozzle and tip exchange system of claim 8 further comprising:
a detector associated with the fluid dispensing system and configured to detect the nozzle to be selected based on the number of nozzle identifier elements.

12. The nozzle and tip exchange system of claim 11, wherein the number of nozzle identifier elements is a number of radio frequency identification tags and wherein the detector is configured to receive a signal from each of the number of radio frequency identification tags.

13. The nozzle and tip exchange system of claim 11 further comprising:
a controller associated with the fluid dispensing system and configured to receive data about the number of nozzle identifier elements from the detector, wherein the controller is configured to send a number of commands to a robotic device controlling movement of the fluid dispensing system to move the fluid dispensing system to the nozzle selected.

14. The nozzle and tip exchange system of claim 8, wherein the fluid dispensing system is configured for attachment to a robotic device configured to control movement of the fluid dispensing system.

15. The nozzle and tip exchange system of claim 8, wherein the attachment interface is configured for use in attaching the nozzle to a sealant cartridge being held by the fluid dispensing system, wherein the attachment interface includes bearings for holding the sealant cartridge in place within the attachment interface.

* * * * *